(12) United States Patent
Ohmae et al.

(10) Patent No.: US 9,053,488 B2
(45) Date of Patent: Jun. 9, 2015

(54) ANSWERING TERMINAL, ANSWERING METHOD AND ANSWER COUNTING SYSTEM

(75) Inventors: Kenichi Ohmae, Tokyo (JP); Yasushi Ito, Tokyo (JP); Hidebumi Hara, Tokyo (JP)

(73) Assignee: BUSINESS BREAKTHROUGH INC., Tokyo (JP)

( * ) Notice: Subject to any disclaimer, the term of this patent is extended or adjusted under 35 U.S.C. 154(b) by 265 days.

(21) Appl. No.: 13/253,847

(22) Filed: Oct. 5, 2011

(65) Prior Publication Data

US 2012/0141969 A1 Jun. 7, 2012

(30) Foreign Application Priority Data

Oct. 8, 2010 (JP) ................................ 2010-228460

(51) Int. Cl.
*G09B 7/00* (2006.01)
*G06Q 30/02* (2012.01)

(52) U.S. Cl.
CPC ...................................... *G06Q 30/02* (2013.01)

(58) Field of Classification Search
CPC ....................................................... G09B 7/00
USPC .......................................................... 434/362
See application file for complete search history.

(56) References Cited

U.S. PATENT DOCUMENTS

2008/0188277 A1* 8/2008 Ritter et al. ....................... 463/9

FOREIGN PATENT DOCUMENTS

| JP | 2005-293160 A | 10/2005 |
|---|---|---|
| JP | 2006-214767 A | 8/2006 |
| JP | 2007-258885 A | 10/2007 |
| JP | 2008-097380 A | 4/2008 |
| JP | 4321935 | 6/2009 |
| JP | 2009-211685 A | 9/2009 |
| JP | 2009-237801 A | 10/2009 |
| JP | 2010-15325 A | 1/2010 |

OTHER PUBLICATIONS

Office Action mailed Feb. 12, 2014, issued in corresponding JP Application No. 2010-228460 (with partial English translation).

* cited by examiner

*Primary Examiner* — Xuan Thai
*Assistant Examiner* — Robert P Bullington
(74) *Attorney, Agent, or Firm* — Squire Patton Boggs (US) LLP

(57) ABSTRACT

Provided herein are an answering terminal, an answer counting system and a question-and-answer session method, which do not force answerers to perform complicated operations of an answering terminal when one questioner and a multiplicity of answerers have a question-and-answer session. The answer counting system comprises a receiving part; a grouping part; a result storing part; an answering action differentiating part; a differentiation result counting and analyzing part; and a displaying part.

13 Claims, 10 Drawing Sheets

ANSWERING TERMINAL, ANSWERING METHOD AND ANSWER COUNTING SYSTEM

BACKGROUND OF THE INVENTION

1. Technical Field

The present invention relates to an answering terminal for use in answering a question and an answer counting system for counting answers. More specifically, the present invention relates to an answering terminal and an answer counting system for use in a question-and-answer session between one questioner and a multiplicity of answerers.

2. Related Art

A question-and-answer session method, in a public speaking situation, such as an academic presentation, seminar, lecture at university, business presentation, workshop or meeting, is known in which a multiplicity of answerers, such as participants answer a question from one questioner as a speaker by, for example, raising their hands. In this case, the questioner predicts the possible types of answers and presents a plurality of answer options to the answerers. Then, the questioner presents the options one by one to the answerers and asks them to raise a hand to show which one of the plurality of options presented by questioner is right for them in order to obtain answers from many answerers. On the other hand, when a question is asked to more answerers, a method is known in which a question-and-answer session is held using answering terminals, called counter (or totalizer), for example, handed out to all the answerers in advance in order to count the number of answers precisely. The answering terminals, called counters, has an answering button for use in counting the answers, and the answerers can make an answer by pressing the answering button of the counter instead of raising a hand. The answers from the answerers are counted by an answer counting system, and the result of counting the answers is displayed on a display device or the like. In addition, a question-and-answer session method is also known in which counters having a plurality of answering buttons corresponding in number to answer options are used and the questioner asks the answerers to press one of the answering buttons corresponding to their choice. The counters (or totalizers) are widely used in a question-and-answer session in a recital, concert, TV discussion program, entertainment program or the like for the purpose of carrying out a survey among a multiplicity of people.

Similarly, device and method for carrying out a survey among a multiplicity of answerers via an information communication network, such as the Internet, are known (for example, Patent Document 1). Patent Document 1 discloses an answering terminal, an answer counting system and an answer counting method with which a multiplicity of answerers can be identified and a survey can be carried out via an information communication network, such as the Internet.

[Patent Document 1] JP-B2-P4321935 (e.g. refer to claim 1 and FIG. 4)

However, when answerers make an answer with an answering terminal, such as a counter, so that the number of answers can be counted correctly, the question-and-answer session may be disturbed because the answerers have to look away from the questioner and visually recognize the answer buttons to press one of a plurality of answering buttons on the answering terminals they are holding and operating. In addition, in a conventional survey method using an information communication network, such as the Internet, the answerers have to make an operation of selecting one of a plurality of options presented by the questioner by operating the answering terminal at each question. In addition, because the answerers have to make a final input operation to finalize the selected option and input it as an answer at each question, the conventional survey method poses a large burden on the answerers. The present invention has been made in view of these problems, and it is, therefore, an object of the present invention to provide an answering terminal and an answer counting system, and a question-and-answer session method using the answering terminals which do not force the answerers to operate a complicated answering terminal when one questioner and a multiplicity of answerers have a question-and-answer session.

SUMMARY OF THE INVENTION

To achieve the above objectives, in an answer counting system of the first aspect of the invention, the answer counting system 10 as shown in FIG. 3, for example, comprises a receiving part 11 for receiving detection results about answering action performed by answerers 2 (refer to FIG. 2A) to answer specific question and detected by motion sensors 101 (refer to FIG. 4) of answering terminals 100 (refer to FIG. 2A) operated by the answerers 2 and terminal codes by which the answering terminal 100 can be identified; a grouping part 12 for grouping the detection results received by the receiving part 11 based on the times of reception of the detection results; a result storing part 15 for storing the detection results in association with the terminal codes for each group grouped by the grouping part 12; an answering action differentiating part 13 for differentiating the detection results between answering actions of shaking the answering terminals in a first direction and answering actions of shaking the answering terminals in a second direction different from the first direction; a differentiation result counting and analyzing part 14 for counting and analyzing the differentiation results; and a displaying part 17 for displaying a count and analysis result counted and analyzed in the differentiation result counting and analyzing part 14.

With this configuration, the receiving part can receive detection results about answering actions performed by answerers to answer a specific question and detected by motion sensors of answering terminals operated by the answerers and terminal codes by which the answering terminals can be identified. Thus, the answer counting system can receive the detection results and the terminal codes to acquire the contents of answers of the answerers and information by which the answerers can be identified. The grouping part can group the detection results received by the receiving part based on the times of reception of the detection results. Thus, the answer counting system can group a group of answers to a question from the one questioner to count and analyze the answers. The result storing part can store the detection results in association with the terminal codes for each group grouped by the grouping part. Thus, the answer counting system can store a group of answers to one question from the one questioner collectively in a grouped state. The answering action differentiating part can differentiate the detection results between answering actions of shaking the answering terminals in a first direction and answering actions of shaking the answering terminals in a second direction different from the first direction. Thus, the answer counting system can distinguish and differentiate the answering actions of the answerers between answering actions of shaking the answering terminals in a first direction (for example, vertical direction) (which mean positive answers, for example) and answering actions of shaking the answering terminal in a the second direction (for example, horizontal direction) (which mean negative answers, for example). The differentiation result counting and analyzing part can count and analyze the differentiation results. Thus, the answer counting system can count and analyze the differentiation results to count and analyze answers to one question. The displaying part can display a count and analysis result counted and analyzed in the differentiation result counting and analyzing part. Thus, the answer counting system can display the count and analysis result on the displaying part to present the count and analysis result about answers to a question to the questioner.

Also, in an answer counting system of the second aspect of the invention, the answer counting system 10 as shown in FIG. 3 according to the first aspect of the invention, for example, wherein the differentiation result counting and analyzing part 14 has an answering action counting part 14A for counting the answering actions performed by shaking the answering terminals 100 (refer to FIG. 2A) in the first direction and second direction and differentiated by the answering action differentiating part 13 without duplication in the group based on the terminal codes.

With this configuration, because the answering terminals can be individually identified and differentiated by the terminal codes, the answering action counting part of the differentiation result counting and analyzing part can count the answering actions performed by shaking the answering terminals in the first direction (for example, vertical direction) and second direction (for example, horizontal direction) and differentiated by the answering action differentiating part without duplication in the group based on the terminal codes. Thus, the answer counting system can exclude duplicate answers made to one question by the same answerers (for example, by regarding only the last answer as a right answer) in counting the answers. In addition, the answer counting system can count the answers without mixing up the answer from one answerer with the answer from another.

Also, in an answer counting system of the third aspect of the invention, the answer counting system 10 as shown in FIG. 3 according to the first or second aspect of the invention, for example, wherein the differentiation result counting and analyzing part 14 has an intensity determining part 14B for quantitatively determining the intensity of each of the answering actions of shaking the answering terminals 100 (refer to FIG. 2A) in the first direction and the answering actions of shaking the answering terminals 100 in second direction differentiated by the answering action differentiating part 13.

With this configuration, the intensity determining part of the differentiation result counting and analyzing part can quantitatively determine the intensity of each of the answering actions of shaking the answering terminals in the first direction (for example, vertical direction) and the answering actions of shaking the answering terminals in the second direction (for example, horizontal direction) differentiated by the answering action differentiating part. Thus, the answer counting system can quantitatively determine whether the answering action of one answerer was performed more strongly or weakly than the answering action of another answerer. In addition, the answer counting system can quantitatively determine whether the answering action performed by an answerer in response to one question was performed more strongly or weakly than the answering action performed by the same answerer in response to another question.

Also, in an answer counting system of the fourth aspect of the invention, the answer counting system 10 as shown in FIG. 3 according to the second or third aspect of the invention, for example, wherein the differentiation result counting and analyzing part 14 has a motion counting part 14C for counting the number of repetitive motions in at least either the answering actions of shaking the answering terminals in the first direction or the answering actions of shaking the answering terminals in the second direction differentiated by the answering action differentiating part 13.

With this configuration, the motion counting part of the differentiation result counting and analyzing part can count the number of repetitive motions of at least either the answering actions of shaking the answering terminals in the first direction (for example, vertical direction) or the answering actions of shaking the answering terminals in the second direction (for example, horizontal direction) differentiated by the answering action differentiating part. Thus, the answer counting system can count and recognize the number of repetitive motions included in the answering actions of the answerers. For example, the answer counting system can allow the answers to show the option they chose by the number of repetitive motions in answering a question having a plurality of options.

Also, in an answer counting system of the fifth aspect of the invention, the answer counting system 10 as shown in FIG. 3 according to any one of the first through to fourth aspects of the invention, for example, wherein the differentiation result counting and analyzing part 14 has a trajectory determining part 14D for determining the trajectories of the answering action of the shaking the answering terminals 100 (refer to FIG. 2A) in the first direction and the answering action of the shaking the answering terminals 100 in the second direction differentiated by the answering action differentiating part 13.

With this configuration, the trajectory determining part of the differentiation result counting and analyzing part can determine the trajectories of the answering actions of shaking the answering terminals in the first direction (for example, vertical direction) and the answering actions of shaking the answering terminals in the second direction (for example, horizontal direction) differentiated by the answering action differentiating part. Thus, the answer counting system can determine the trajectories of the answering actions of the answerers and allow the answerers to make an answer other than the answers by shaking the answering terminals in the first direction (for example, vertical direction) and the second direction (for example, horizontal direction). For example, when an answerer has reversely a question, the questioner can know it by allowing the answerer to shake the answering terminal in a circular trajectory. In this way, the answerers can present an answer other than the options or information to the questioner, which may lead to an interactive question-and-answer session between the questioner and the answerers.

Also, in an answer counting system of the sixth aspect of the invention, the answer counting system 10 as shown in FIG. 3 according to any one of the first through to fifth aspects of the invention, for example, further comprises a display information selecting part 16 for selecting an item to be displayed on the displaying part 17 in the count and analysis result counted and analyzed in the differentiation result counting and analyzing part 14.

With this configuration, the display information selecting part can select an item to be displayed on the displaying part in the count and analysis result counted and analyzed in the differentiation result counting and analyzing part. Thus, the answer counting system can selectively display a count and analysis result to which the questioner need to refer in some cases on the displaying part and present it to the questioner. For example, the result of counting the answerers who performed the answering actions of shaking the answering terminal in the first direction (for example, vertical direction) and the answerers who performed the answering actions of shaking the answering terminal in the second direction (for example, horizontal direction), the result of counting the answerers who performed either of the answering actions, or the terminal codes of the answerers who performed an answering action of making a trajectory other than the answering actions of shaking the answering terminal in the first direction (for example, vertical direction) and the second direction (for example, horizontal direction) can be selectively displayed.

Also, in an answering terminal of the seventh aspect of the invention, the answering terminal 100 as shown in FIG. 4, for example, comprises a motion sensor 101 for detecting an answering action performed by an answerer 2 (refer to FIG. 2A) in response to a specific question and outputting a detection result about the answering action detected with a distinction between a first direction and a second direction different from the first direction; a terminal code inputting part 102 through which a terminal code by which the answering terminal 100 is identified is input; a terminal code storing part 103 for storing the terminal code input through the terminal code inputting part 102; and a transmitting part 104 for transmitting the detection result detected by the motion sensor 101 in association with the terminal code stored in the terminal code storing part 103 to an answer counting system 10 (refer to FIG. 3), wherein the transmitting part 104 has a transmission time delaying part 104A for delaying the time of transmission from the time when the motion sensor 101 detects an answering action of the answerer 2 by a predetermined delay time.

With this configuration, the motion sensor can output an answering action performed by an answerer in response to a specific question as a detection result detected with a distinction between a first direction and a second direction different from the first direction. Thus, the motion sensor can detect an answering action performed by the answerer by shaking the answering terminal in the first direction (for example, vertical direction) and an answering action performed by the answerer by shaking the answering terminal in the second direction (for example, horizontal direction) distinctively. The terminal code inputting part can allow a terminal code by which the answering terminal is identified to be input. Thus, a terminal code by which the answering terminal and the answerer can be individually identified and differentiated, can be provided to the answering terminal. When a cellular phone is used as the answering terminal, the telephone number of the cellular phone may be used as the terminal code. In this case, it is possible to have the terminal code to be input by the telephone company. The terminal code storing part can store the terminal code input through the terminal code inputting part. Thus, the answering terminal can refer to and use the terminal code stored in the terminal code storing part as needed. The transmitting part can transmit the detection result detected by the motion sensor in association with the terminal code stored in the terminal code storing part to an answer counting system. Thus, the answer counting system can receive a detection result detected by the motion sensor and the terminal code stored in the terminal code storing part to obtain the content of the answer of the answerer and information by which the answerer can be identified. The transmission time delaying part of the transmitting part can delay the time of transmission from the time when the motion sensor detects an answering action of the answerer by a predetermined delay time. Thus, even in a seminar in which a few hundred to several thousand answerers are participating, for example, congestion in information communication between the transmitting parts and the answer counting system can be avoided and information communication can be carried out properly by allocating different delay times to the answering terminals of the answerers or dividing the answerers into groups and allocating different delay times to the groups. With these configurations, when the answerers and the questioner have a direct question-and-answer session in the same space and time, the answerers can answer a question from the questioner properly using the answering terminals of the present invention.

Also, in an answering terminal of the eighth aspect of the invention, the answering terminal 100 as shown in FIG. 4 according to the seventh aspect of the invention, for example, further comprises a receiving part 105 for receiving information including the question; and a reproducing part 106 for reproducing and presenting the information including a question to the answerer 2 (refer to FIG. 2A).

With this configuration, the receiving part can receive information including the question. Thus, the answering terminal can receive and obtain information including the question transmitted through broadcasting or via an information communication network, such as the Internet. The reproducing part can reproduce and present the information including the question to the answerer. Thus, the answering terminal can reproduce the information including the question and received by the receiving part and present it to the answerer. With these configurations, even when the answerers and questioner has a question-and-answer session in shared (the same) time but in a spatially separated manner, the answerers can properly answer a question from the questioner with the answering terminal according to the present invention.

Also, in an answering terminal of the ninth aspect of the invention, the answering terminal 100A as shown in FIG. 5, for example, comprises a motion sensor 101 for detecting an answering action performed by an answerer 2 (refer to FIG. 2A) in response to a specific question and outputting a detection result about the answering action detected with a distinction between a first direction and a second direction different from the first direction; a terminal code inputting part 102 through which a terminal code by which the answering terminal 100A is identified is input; a terminal code storing part 103 for storing the terminal code input through the terminal code inputting part 102; a receiving part 105 for receiving information including the question; a reproducing part 106 for reproducing and presenting the information including the question to the answerer 2; a clock 107 for outputting a detection time when the motion sensor 101 detected an answering action of the answerer 2 on the time scale of the period in which the information including the question is presented to be reproduced by the reproducing part 106; and a transmitting part 104 for transmitting the detection result detected by the motion sensor 101 in association with the terminal code stored in the terminal code storing part 103 and the detection time output from the clock 107 to an answer counting system 10 (refer to FIG. 3).

With this configuration, the clock can output a detection time when the motion sensor detected an answering action of the answerer on the time scale of the period in which the information including the question is presented to be reproduced by the reproducing part. Thus, the detection time when the motion sensor detected an answering action of the answerer on the time scale of the period in which information presentation made in real time by the questioner to present the information including the question proceeded can be output and obtained from the clock. With these configurations, even when the answerers and questioner have a question-and-answer session in a temporally separated manner, the answer counting system can recognize the time when the answerer performed an answering action at a time in the light of the period in which information presentation made by the questioner in real time to present the information including the question proceeded.

Also, in an answering terminal of the tenth aspect of the invention, the answering terminal 100B as shown in FIG. 6, for example, comprises a motion sensor 101 for detecting an answering action performed by an answerer 2 (refer to FIG. 2A) in response to a specific question and outputting a detection result about the answering action detected with a distinction between a first direction and a second direction different from the first direction; a terminal code inputting part 102 through which a terminal code by which the answering terminal 100B is identified is input; a terminal code storing part 103 for storing the terminal code input through the terminal code inputting part 102; a receiving part 105 for receiving information including the question; an information storing part 108 for storing the received information including the question; a reproducing part 106 for reproducing and presenting the information including the question and stored in the information storing part 108 to the answerer 2; a clock 107 for outputting a detection time when the motion sensor 101 detected an answering action of the answerer 2 on the time scale of the period in which the information including the question is presented to be reproduced by the reproducing part 106; a detection result storing part 109 for storing the detection result detect by the motion sensor 101 and the detection time output from the clock 107 in association with each other; and a transmitting part 104 for transmitting the detection result and the detection time stored in the detection result storing part 109 in association with the terminal code stored in the terminal code storing part 103 to an answer counting system 10 (refer to FIG. 3).

With this configuration, the information storing part can store the received information including the question. Thus, the answerer can use the information including the question and stored in the information storing part as needed. The reproducing part can reproduce and present the information including the question and stored in the information storing part to the answerer. The answerer can reproduce the information including the question and stored in the information storing part with the reproducing part and answer to the question as needed. The detection result storing part can store the detection result detected by the motion sensor and the detection time output from the clock in association with each other. Thus, the answerer and the answering terminal can use the information of the detection result detected by the motion sensor and the detection time output from the clock, which are stored in the detection result storing part, as needed. The transmitting part can transmit the detection result and the detection time stored in the detection result storing part in association with the terminal code stored in the terminal code storing part to an answer counting system. Thus, the answerer and the answering terminal can transmit the detection result and the detection time in association with the terminal code to the answer counting system with the transmitting part as needed. With these configurations, even when the answerers and the questioner have a question-and-answer session in a temporally separated manner, each answerer can reproduce the information including the question and answer to the question as needed and can transmit the detection result as information representing the content of the answer of the answerer to the question from the questioner and the detection time and the terminal code to the answer counting system as needed. In addition, the answer counting system can count and analyze the answers.

Also, in an answering terminal of the eleventh aspect of the invention, the answering terminal 100 according to any one of the seventh aspect with the answering terminal 100 through to the tenth aspect with the answering terminal 100B, for example, wherein the motion sensor 101 is configured to detect the intensity of the answering action.

With this configuration, the motion sensor can detect the intensity of the answering action. Thus, in the count and analysis of answers in the answer counting system, the quantity indicating the intensity of the answering action of the answerer can be quantitatively recognized from the detection result about the answering action of the answerer detected by the motion sensor. Thus, the degree of the positivity or negativity of the positive or negative answer of the answerer can be recognized from the answering action of the answerer.

Also, in a method for answering a question using an answering terminal of the twelfth aspect of the invention, the method as shown in FIG. 7 for answering a question using the answering terminal 100 (refer to FIG. 1, FIG. 2A and FIG. 4), for example, comprises a step STP01 of inputting a terminal code by which the answering terminal 100 is identified through a terminal code inputting part 102 (refer to FIG. 4) of the answering terminal 100; a step STP02 in which an answerer 2 holding the answering terminal 100 performs an answering action of shaking the answering terminal 100 in a first direction or a second direction different from the first direction in response to the question; a step STP03 of detecting the answering action with a motion sensor 101 (refer to FIG. 4) of the answering terminal 100 for outputting the answering action as a detection result detected with a distinction between the first direction and the second direction different from the first direction; and a step STP04 of transmitting the detection result detected by the motion sensor 101 in association with the terminal code from a transmitting part 104 (refer to FIG. 4) of the answering terminal 100 to an answer counting system 10 (refer to FIG. 1 and FIG. 3); wherein the step STP04 of transmitting from the transmitting part 104 to the answer counting system 10 includes a step STP04A in which a transmission time delaying part 104A (refer to FIG. 4) of the transmitting part 104 delays the time of transmission from the time when the motion sensor 101 detects the answering action by a predetermined delay time.

With this configuration, a terminal code by which the answering terminal can be identified can be input through the terminal code inputting part of the answering terminal (STP01). Thus, even when a multiplicity of answering terminals are present, the answering terminal, and therefore the answerer, can be individually identified and differentiated with no mixing up. The answerer holding the answering terminal can make an answer by performing an answering action of shaking the answering terminal in a first direction (for example, vertical direction) or a second direction different from the first direction (for example, lateral direction (horizontal direction)) in response to a question (STP02). Thus, the answerer can answer the question by performing an answering action of shaking the answering terminal in the first direction (which means a positive answer, for example) or an answering action of shaking the answering terminal in the second direction (which means a negative answer, for example). The answering action can be detected by the motion sensor of the answering terminal for outputting the answering action as a detection result detected with the distinction between a first direction and a second direction different from the first direction (STP03). Thus, the motion sensor can detect an answering action performed by the answerer by shaking the answering terminal in the vertical direction, for example (which means a positive answer, for example) and an answering action performed by the answerer by shaking the answering terminal in the lateral direction, for example (which means a negative answer, for example) distinctively. The detection result detected by the motion sensor can be transmitted in association with the terminal code to the answer counting system by the transmitting part of the answering terminal (STP04). Thus, the answer counting system can obtain a content of the answer from the answerer and information by which the answerer can be identified. The step of transmitting from the transmitting part to the answer counting system (STP04) can be configured to delay the time of transmission from the time when the motion sensor detects the answering action by a predetermined delay time using the transmission time delaying part of the transmitting part (STP04A). Thus, even in a seminar in which a few hundred to several thousand answerers are participating, for example, the times of transmission from a multiplicity of answering terminals can be spread to avoid congestion in information communication between the answering terminals and the answer counting system. With these configurations, when the answerers and the questioner have a direct question-and-answer session in the same space and time, the answerers can answer a question from the questioner properly using the answering terminals of the present invention.

Also, in a method for answering a question using an answering terminal of the thirteenth aspect of the invention, the method as shown in FIG. 8 for answering a question using the answering terminal 100B (refer to FIG. 6), for example, comprises a step STP01 of inputting a terminal code by which the answering terminal 100B is identified through a terminal code inputting part 102 (refer to FIG. 6) of the answering terminal 100B; a step STP11 of storing the terminal code input through the terminal code inputting part 102 in a terminal code storing part 103 (refer to FIG. 6) of the answering terminal 100B; a step STP12 of receiving information including the question with a receiving part 105 (refer to FIG. 6) of the answering terminal 100B; a step STP13 of storing the received information including the question in an information storing part 108 (refer to FIG. 6) of the answering terminal 100B; a step STP14 of reproducing and presenting the information including the question stored in the step STP13 of storing in the information storing part 108 to an answerer 2 (refer to FIG. 2A) with a reproducing part 106 (refer to FIG. 6) of the answering terminal 100B; a step STP02 in which the answerer 2 holding the answering terminal 100B performs an answering action of shaking the answering terminal 100B in a first direction or a second direction different from the first direction in response to the question; a step STP03 of detecting the answering action with a motion sensor 101 (refer to FIG. 6) of the answering terminal 100B for outputting the answering action as a detection result detected with a distinction between the first direction and the second direction different from the first direction; a step STP15 of outputting from a clock 107 (refer to FIG. 6) of the answering terminal 100B a detection time when the motion sensor 101 detected the answering action of the answerer 2 on the time scale of the period in which the information including the question is presented to be reproduced by the reproducing part 106; a step STP16 of storing the detection result detected by the motion sensor 101 in association with the detection time output from the clock 107 in the step STP15 of outputting a detection time in a detection result storing part 109 (refer to FIG. 6) of the answering terminal 100B; and a step STP04 of transmitting the detection result and the detection time stored in the step STP16 of storing in the detection result storing part 109 in association with the terminal code stored in the terminal code storing part 103 from a transmitting part 104 (refer to FIG. 6) of the answering terminal 100B to an answer counting system 10 (refer to FIG. 1 and FIG. 3).

With this configuration, a terminal code by which the answering terminal can be identified can be input through the terminal code inputting part of the answering terminal (STP01). Thus, even when a plurality of or even multiplicity of answering terminals are present, the answering terminal can be individually identified and differentiated with no mixing up. The terminal code input through the terminal code inputting part can be stored in the terminal code storing part of the answering terminal (STP11). Thus, the answering terminal can use the terminal code, by which the answering terminal can be individually differentiated and identified, stored in the terminal code storing part as needed. Information including the question can be received by the receiving part of the answering terminal (STP12). Thus, the answering terminal can obtain the information including the question through information communication via an information communication network, such as the Internet. The received information including the question can be stored in the information storing part of the answering terminal (STP13). Thus, the answerers can store the information including the question in the information storing part and use it.

The information including the question stored in the step of storing in the information storing part (STP13) can be reproduced and presented to the answerer by the reproducing part of the answering terminal (STP14). Thus, the answerer can reproduce and view the information including the question with the reproducing part as needed. The answerer holding the answering terminal can make an answer by performing an answering action of shaking the answering terminal in a first direction or a second direction different from the first direction in response to the question (STP02). Thus, the answerer can answer the question by performing an answering action of shaking the answering terminal in the first direction (for example, vertical direction) (which means a positive answer, for example) or an answering action of shaking the answering terminal in the second direction (for example, horizontal direction) (which means a negative answer, for example). The answering action can be detected by a motion sensor of the answering terminal for outputting the answering action as a detection result detected with the distinction between the first direction and the second direction different from the first direction (STP03). Thus, the motion sensor can detect an answering action performed by the answerer by shaking the answering terminal in the first direction (for example, vertical direction) (which means a positive answer, for example) and an answering action performed by the answerer by shaking the answering terminal in the second direction (for example, horizontal direction) (which means a negative answer, for example) distinctively.

A detection time when the motion sensor detected the answering action of the answerer on the time scale of the period in which the information including the question is presented to be reproduced by the reproducing part can be output from the clock of the answering terminal (STP15). Thus, the time when the answerer performed an answering action can be output from the clock as the detection time in conformity with the period in which presentation of the information including the question made in real time by the questioner proceeded. The detection result detected by the motion sensor and the detection time output in the step of outputting a detection time from the clock (STP15) can be stored in association with each other in the detection result storing part of the answering terminal (STP16). Thus, the answerer can transmit the detection result and detection time stored in the detection result storing part to the answer counting system as needed. The detection result and detection time stored in the step of storing in the detection result storing part (STP16) can be transmitted to the answer counting system in association with the terminal code stored in the terminal code storing part by the transmitting part of the answering terminal (STP04). Thus, the answer counting system can obtain a content of the answer from the answerer and information by which the answerer can be identified.

With these configurations, even when the answerers and the questioner have a question-and-answer session in a temporally separated manner, each answerer can reproduce the information including the question and answer to the question as needed and can transmit the detection result as information representing the content of the answer of the answerer to the question from the questioner and the detection time and the terminal code to the answer counting system as needed. The answer counting system can recognize the time when the answerer performed an answering action at a time in the light of the period in which information presentation made by the questioner in real time to present the information including the question proceeded.

According to the answering terminal, the answer counting system and the method for answering a question using the answering terminal according to the present invention, an answering terminal, an answer counting system and a question-and-answer session method which do not force answerers to perform complicated operations of an answering terminal when one questioner and a multiplicity of answerers have a question-and-answer session can be provided.

The basic Japanese Patent Application No. 2010-228460 filed on Oct. 8, 2010 is hereby incorporated in its entirety by reference into the present application. The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description. The applicant has no intention to give to public any disclosed embodiments. Among the disclosed changes and modifications, those which may not literally fall within the scope of the present claims constitute, therefore, a part of the present invention in the sense of doctrine of equivalents.

DETAILED DESCRIPTION OF THE PREFERRED EMBODIMENT

An embodiment of the invention will be hereinafter described in reference to the drawings.

Figure 1:
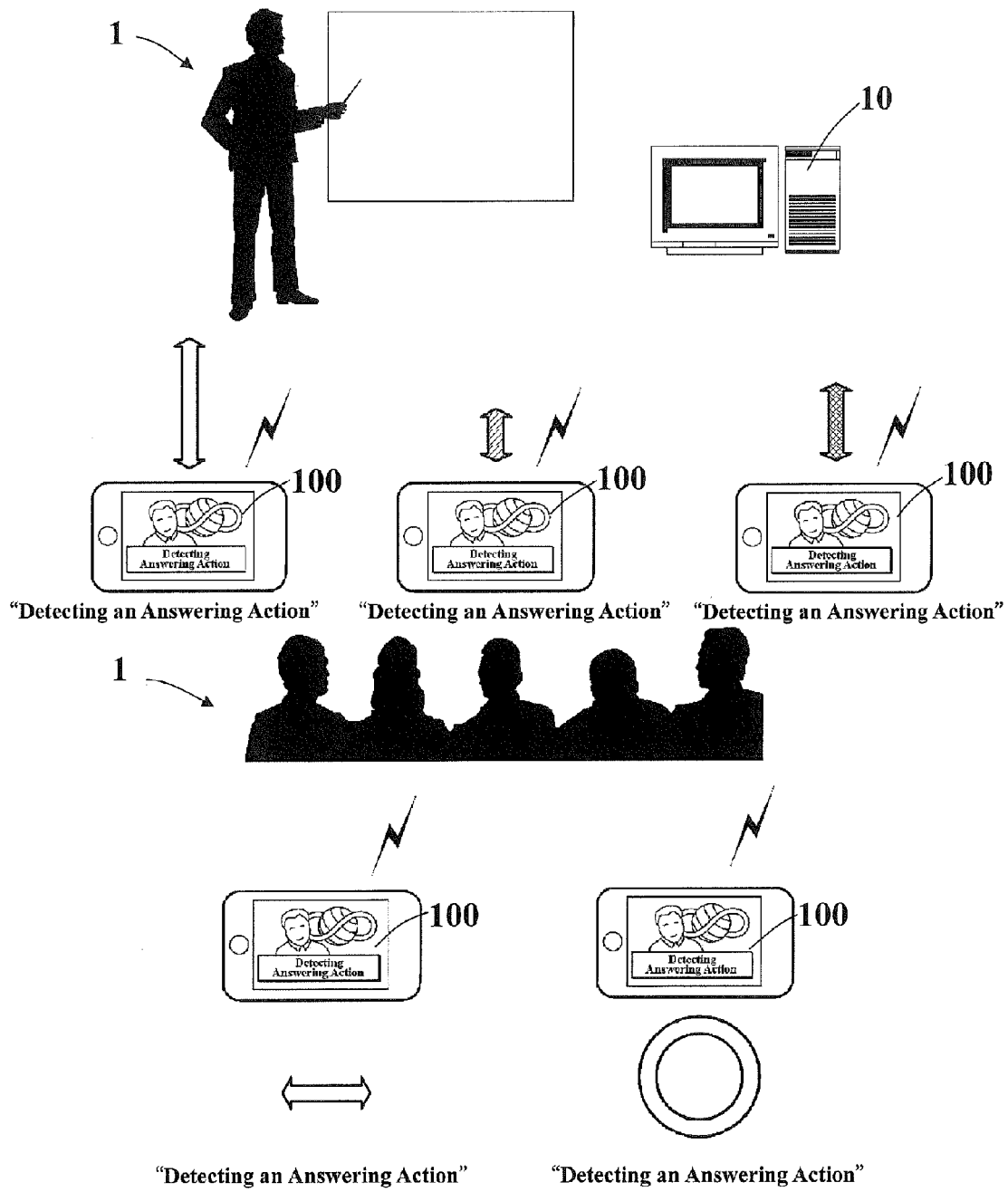
FIG. 1 is an explanatory view illustrating an example of a question-and-answer session between one questioner and a multiplicity of answerers using an answer counting system and answering terminals according to a first embodiment of the present invention.

FIG. 1 is an explanatory view illustrating an example of a question-and-answer session between one questioner 1 and a plurality (multiplicity) of answerers 2 using an answer counting system 10 and answering terminals 100 according to a first embodiment of the present invention. The answer counting system 10 and the answering terminals 100 according to the first embodiment of the present invention shown in FIG. 1 can be used by a multiplicity of answerers 2 to answer a question from one questioner 1 in an occasion of public speaking, such as an academic presentation, seminar, lecture at a university, business presentation, workshop or meeting, for example. As described in detail later, the answering terminal 100 according to this embodiment includes a motion sensor 101 (refer to FIG. 4) for detecting an answering action performed by an answerer 2 to answer a specific question from the questioner 1 by holding the answering terminal 100 in one hand and shaking it. When the motion sensor 101 detects an answering action of the answerer 2, the detection result about the answering action detected by the motion sensor 101 is transmitted to the answer counting system 10 by a transmitting part 104 (refer to FIG. 4) of the answering terminal 100. At this time, the detection result is transmitted to the answer counting system 10 in association with a terminal code which is stored in a terminal code storing part 103 (refer to FIG. 4) of the answering terminal 100 and by which the answering terminal 100 operated by the answerer 2 can be individually identified. The motion sensor 101 is described in detail later.

The answer counting system 10 according to this embodiment shown in FIG. 1, which is operated by the one questioner 1, has a receiving part 11 (refer to FIG. 3) for receiving the detection results as contents of answers from the answerers 2 and terminal codes by which individual answerers 2 (answering terminals 100) can be identified transmitted from a multiplicity of answering terminals 100 operated by a multiplicity of answerers 2. The answer counting system 10 also has an answering action differentiating part 13 (refer to FIG. 3), which is described in detail later, for distinguishing and differentiating the answering actions performed by the answerers 2 into two types of actions based on the detection results received by the receiving part 11. Specifically, the answering action differentiating part 13 can distinguish and differentiate the answering actions performed by the answerers 2 between answering actions of shaking the answering terminal 100 in a first direction (for example, vertical direction) and answering actions of shaking the answering terminal 100 in a second direction (different from the first direction) (for example, horizontal direction). The answer counting system 10 also has a differentiation result counting and analyzing part 14 (refer to FIG. 3) for counting and analyzing the differentiation results differentiated by the answering action differentiating part 13 and outputting count and analysis results. The answer counting system 10 also has a displaying part 17 (refer to FIG. 3) for displaying and presenting the count and analysis results to the questioner 1.

It is desirable that the one questioner 1 and the answerers 2, who have a question-and-answer session using the answer counting system 10 and the answering terminals 100 according to this embodiment shown in FIG. 1, should in advance agree about the answering actions that the answerers 2 should perform to answer the questions from the one questioner 1. For example, it is desirable that an answering action by which the answerers 2 make an positive answer to a question from the questioner 1 (for example, shaking the answering terminal 100 in a vertical direction) and an answering action by which the answerers 2 make a negative answer (for example, shaking the answering terminal 100 in a horizontal direction) should be specifically determined. Further, an answering action the answerers 2 should perform to inform the questioner 1 of the request that they want to ask a question conversely to the questioner 1 (for example, an answering action of drawing a circle with the answering terminal 100) may be specifically determined. Alternatively, an answering action the answerers 2 should perform to inform the questioner 1 of the request that they want to make a suggestion (for example, an answering action of drawing a figure "8" with the answering terminal 100) may be specifically determined. It is desirable that the questioner 1 should inform the answerers 2 of such rules prior to the question-and-answer session.

Figure 2A:
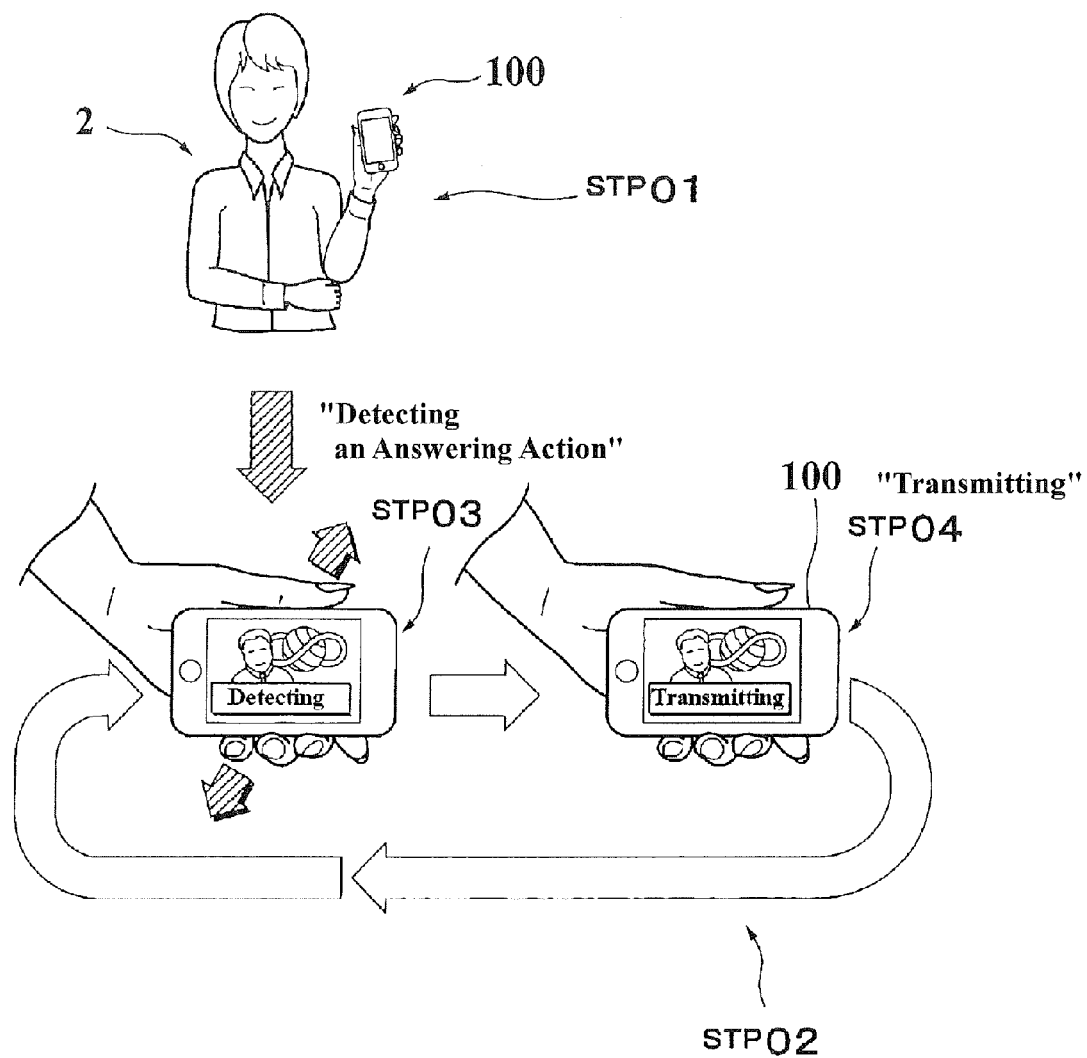
FIG. 2A is an explanatory view illustrating an example of an answer made by an answerer using the answering terminal according to the first embodiment of the present invention.
Figure 2B:
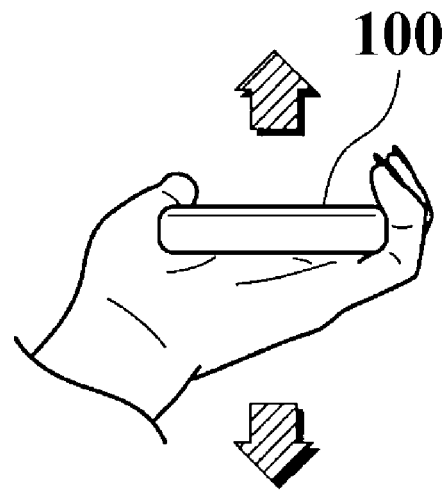
FIG. 2B is an explanatory view illustrating an example of an answer made by an answerer using the answering terminal according to the first embodiment of the present invention.
Figure 2C:
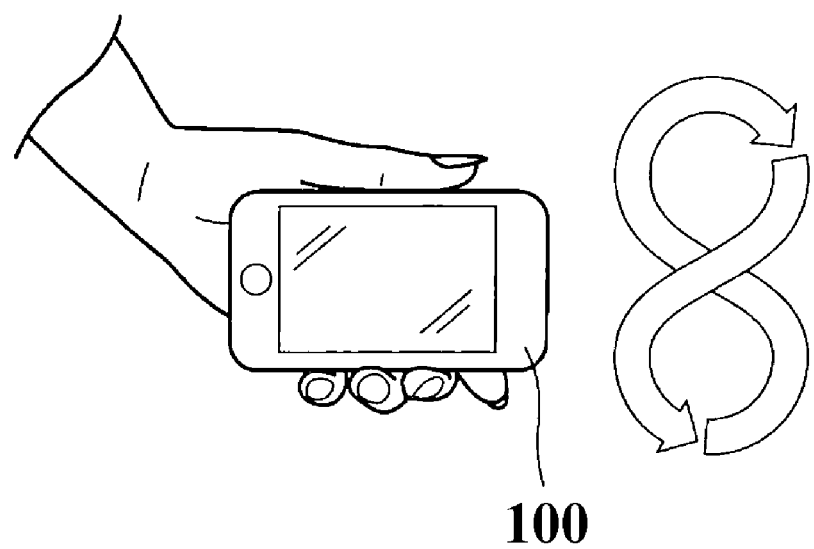
FIG. 2C is an explanatory view illustrating an example of an answer made by an answerer using the answering terminal according to the first embodiment of the present invention.

FIG. 2A to FIG. 2C show an example in which an answerer 2 answers a question using the answering terminal 100 according to the first embodiment of the present invention. FIG. 2A is an explanatory view schematically illustrating a method for answering a question using the answering terminal 100 of this embodiment. As shown in FIG. 2A, prior to answering using the answering terminal 100 according to this embodiment, the answerer 2 inputs in his or her answering terminal 100 a terminal code by which the answering terminal 100 operated by the answerer 2 can be individually identified and differentiated (STP01). Next, the answerer 2 answers the question from the questioner 1 (refer to FIG. 1) by performing an answering action (STP02). Then, the motion sensor 101 (refer to FIG. 4) of the answering terminal 100 detects the answering action performed by the answerer 2 (STP03). Then, the transmitting part 104 (refer to FIG. 4) of the answering terminal 100 transmits the detection result detected by the motion sensor 101 and the terminal code which is stored in the terminal code storing part 103 (refer to FIG. 4) of the answering terminal 100 and by which the answering terminal 100 can be individually identified and differentiated to the answer counting system 10 (refer to FIG. 1) (STP04). It should be noted that when cellular phones owned by the answerers 2 are used as the answering terminals 100, for example, the telephone numbers of the cellular phones, for example, may be used as the terminal codes.

FIG. 2B is an explanatory view illustrating an example of an answering action of shaking the answering terminal 100 according to this embodiment in a first direction (for example, vertical direction). As described in detail later, the motion sensor 101 (refer to FIG. 4) can detect an answering action performed by the answerer 2 (refer to FIG. 2A) with the distinction between a first direction (for example, vertical direction) and a second direction (different from the first direction) (for example, horizontal direction). In the example shown in FIG. 2B, the questioner 1 (refer to FIG. 1) and the answerers 2 have decided a rule that the answerers 2 should shake the answering terminal 100 in a vertical direction to make a positive answer to a question from the questioner 1 and shake the answering terminal 100 in a horizontal direction to make a negative answer to a question from the questioner 1 prior to the question-and-answer session. Thus, FIG. 2B shows an example in which an answerer 2 is performing an answering action of shaking the answering terminal 100 in a vertical direction to make a positive answer to a question from the questioner 1.

FIG. 2C shows an example in which an answerer 2 (refer to FIG. 2A) answers a question from the questioner 1 (refer to FIG. 1) by drawing a figure "8" with the answering terminal 100 according to this embodiment. As described in detail later, the answering terminal 100 according to this embodiment has a motion sensor 101 (refer to FIG. 4) that can detect the trajectory of an answering action performed by the answerer 2. In addition, the differentiation result counting and analyzing part 14 (refer to FIG. 3) of the answer counting system 10 according to this embodiment (refer to FIG. 1) has a trajectory determining part 14D (refer to FIG. 3) which can determine the trajectory of an answering action performed by the answerer 2. Thus, when the answering terminals 100 and the answer counting system 10 according to this embodiment are used in a question-and-answer session, the answerers 2 can make an answer by drawing an arbitrary letter with the answering terminal 100.

Figure 3:
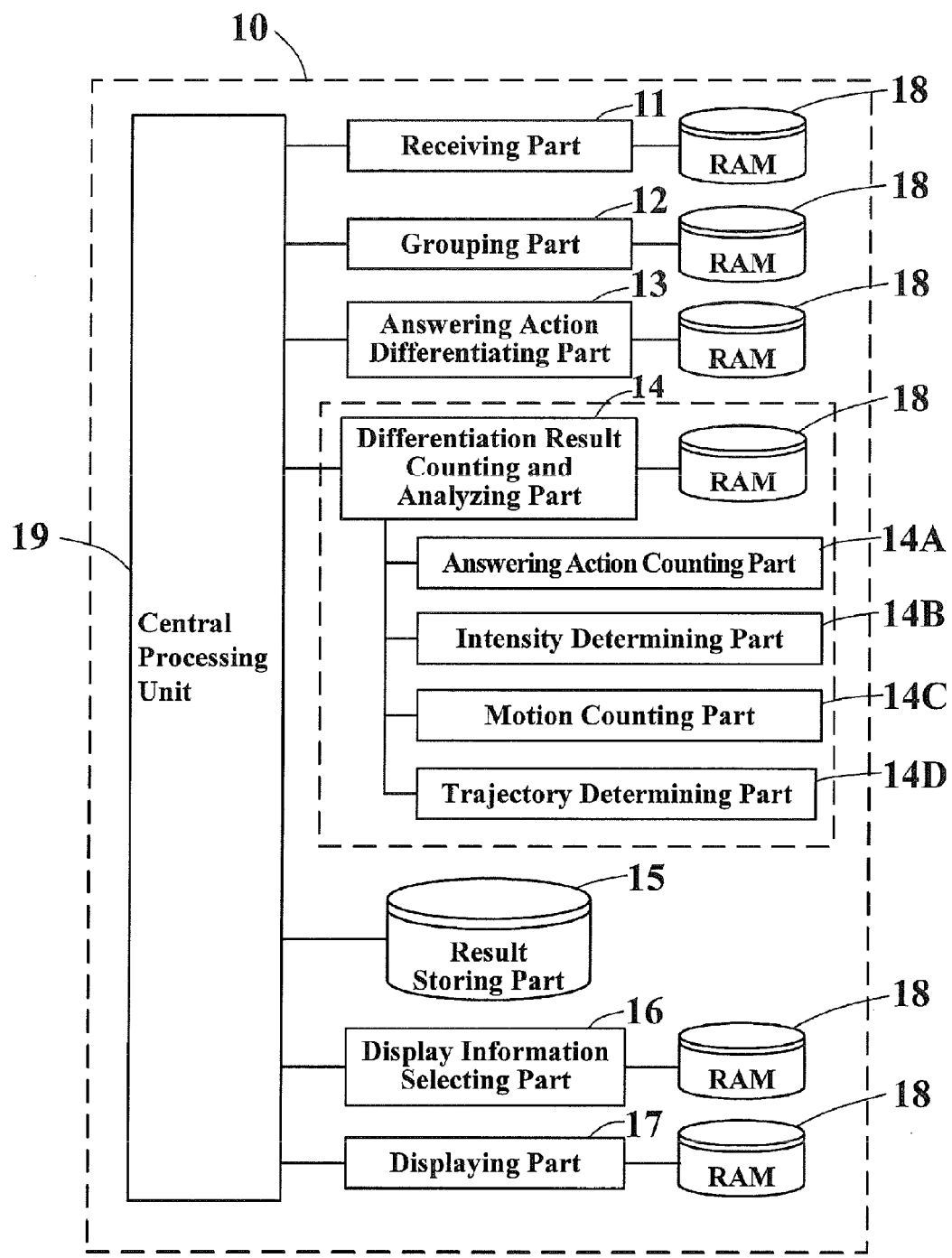
FIG. 3 is a block diagram illustrating the configuration of the answer counting system according to the first embodiment of the present invention.

Next, FIG. 3 is a block diagram illustrating the configuration of the answer counting system 10 according to the first embodiment of the present invention. The receiving part 11 of the answer counting system 10 shown in FIG. 3 is an information communication device for receiving the detection results detected by the motion sensors 101 (refer to FIG. 4) and the terminal codes which are transmitted from the answering terminals 100 (refer to FIG. 1 and FIG. 2A). The transmitting parts 104 (refer to FIG. 4) of the answering terminals 100 according to this embodiment and the receiving part 11 of the answer counting system 10 can perform information communication with each other through wireless communication. Because the answering terminals 100 and the answer counting system 10 can perform information communication with each other through wireless communication, the answerers 2 (refer to FIG. 1 and FIG. 2A) can perform an answering action freely by, for example, holding and shaking the answering terminal 100 according to this embodiment with one hand without being disturbed by a cable for information communication. On the other hand, in another embodiment, the answering terminals 100 and the answer counting system 10 may be connected by a cable for information communication and perform information communication with each other through the cable, for example. In this case, the answering terminals 100 and the answer counting system 10 can be provided with a simpler structure and congestion in information communication can be avoided by simplifying the information communication process.

When the number of answerers 2 participating in the question-and-answer session is relatively small, the wireless information communication between the answer counting system 10 shown in FIG. 3 and the answering terminals 100 (refer to FIG. 1 and FIG. 2A) may be achieved by using a near field communication standard "Bluetooth" (Trade mark) standardized by IEEE, for example. On the other hand, when the number of answerers 2 is relatively large, wireless information communication via an information communication network, such as a wide area network (WAN) or local area network (LAN), using the TCP/IP system may be used. As the wireless communication system, any known wireless communication standard, in addition to wireless communication standards for cellular phones, may be used.

A grouping part 12 of the answer counting system 10 shown in FIG. 3 can group the detection results received by the receiving part 11 according to the receipt time. It can be said that the answering actions performed by a multiplicity of answerers 2 (refer to FIG. 1 and FIG. 2A) to answer a question from the questioner 1 (refer to FIG. 1) are performed generally simultaneously in response to presentation of the question by the questioner 1. The detection results about the answering actions of the answerers 2 detected by the motion sensors 101 (refer to FIG. 4) of the answering terminals 100 (refer to FIG. 1 and FIG. 2A) are transmitted generally simultaneously from the transmitting parts 104 (refer to FIG. 4) of the answering terminals 100 in response to the detection of the answering actions of the answerers 2 by the motion sensors 101. In addition, the detection results are received generally simultaneously by the receiving part 11. Thus, it is meaningful that the grouping part 12 groups the answers (detection results) transmitted from a multiplicity of answerers 2 based on the times when the receiving part 11 received the answers (for example, the answers received by the receiving part 11 within five seconds). The grouping by the grouping part 12 enables the answers (detection results and terminal codes) from a multiplicity of answerers 2 to one question from the one questioner 1 to be treated collectively as a group of answers (detection results and terminal codes).

The grouping part 12 shown in FIG. 3 functions as described below. When the question is to ask simply whether the answer is in favor or not in favor, the period of time from when the question is asked till when the first answer arrives is relatively short. For example, suppose that the first answer is responded one second later, most answers are responded between one and two seconds later and all the answers are responded within three seconds. In other words, all answers are responded for two seconds. In this case, groups can be divided by determining that the interval between one group and the next group is two seconds or longer. That is, it is desirable to determine a time period between the reception of the first and supposedly last answers and divide groups at time intervals longer than the time period. The groups can be clearly divided if the time interval is a few times, such as twice to fifth times, longer than the time period in view of the presence of answerers 2 (refer to FIG. 1 and FIG. 2A) who answer late. The grouping may be carried out by an external input. In this case, the questioner 1 (refer to FIG. 1) may divide groups for example by clicking a button to finish reception of answers. When the number of answerers 2 (such as participants of a lecture) is large, it is desirable that the answering terminals 100 (refer to FIG. 1 and FIG. 2A) have a transmission time delaying part 104A (refer to FIG. 4) as described later. In this case, a delay time should be taken into account and the time interval at which groups are divided should be longer by the delay time.

The groups of answers (detection results and terminal codes) grouped by the grouping part 12 shown in FIG. 3 are handled as a group in which detection result of each answerer 2 is associated with a terminal code by which the answerer 2 (the answering terminal 100 (refer to FIG. 1 and FIG. 2A)) can be individually identified and differentiated. In addition, the groups of answers (detection results and terminal codes) are stored in this grouped state and separately from other groups in a result storing part 15 of the answer counting system 10 shown in FIG. 3. Specifically, the grouping by the grouping part 12 may be configured to store the detection results and terminal codes received by the receiving part 11 in association with the receipt times in the result storing part 15, for example. Alternatively, the detection results, terminal codes and receipt times received by the receiving part 11 may be stored in the result storing part 15 in association with a group number as an identification number given by the grouping part 12. Thus, the answer counting system 10 can automatically store a group of answers to one question collectively in the result storing part 15. In addition, the answer counting system 10 can differentiate, count and analyze the answers using the information (detection results and terminal codes) of a group of answers to one question stored in the result storing part 15 as needed.

The answering action differentiating part 13 of the answer counting system 10 shown in FIG. 3 can differentiate detection results detected by the motion sensors 101 (refer to FIG. 4) of the answering terminals 100 (refer to FIG. 1 and FIG. 2A) between answering actions of shaking the answering terminals 100 in a first direction (for example, vertical direction) or answering actions of shaking the answering terminals 100 in a second direction (different from the first direction) (for example, horizontal direction). It is desirable that the motion sensor 101 of the answering terminal 100 is constituted of an acceleration sensor having a plurality of detection axes (for example, three axes) perpendicular to each other as described in detail later. With this configuration, an answering action performed by an answerer 2 (refer to FIG. 1 and FIG. 2A) by shaking the answering terminal 100 in a first direction (for example, vertical direction) or a second direction (different from the first direction) (for example, horizontal direction) can be suitably detected as a detection result. In addition, the answering action differentiating part 13 can differentiate the answering actions of the answerers 2 into one of two types of answering actions with reference to the detection results detected by the motion sensors 101 of the answering terminals 100. Specifically, the answering action differentiating part 13 can distinguish and differentiate the answering actions performed by the answerers 2 between answering actions of shaking the answering terminal 100 in a first direction (for example, vertical direction) and answering actions of shaking the answering terminal 100 in a second direction (different from the first direction) (for example, horizontal direction).

The answering action differentiating part 13 shown in FIG. 3 can distinguish and differentiate the answering actions performed by the answerers 2 (refer to FIG. 1 and FIG. 2A) by shaking the answering terminals 100 (refer to FIG. 1 and FIG. 2A) by recognizing the gravity detection direction included in the detection results from the acceleration sensors, for example. For example, the answering action differentiating part 13 can differentiate and recognize an answering action performed by one answerer 2 by shaking his or her answering terminal 100 in a first direction (for example, up and down direction) based on the angle formed by the first direction (for example, up and down direction), in which the answering terminal 100 was shaken, and the gravity detection direction (vertical direction) (for example, as an angle equal to or smaller than 45 degrees). The answering action differentiating part 13 can differentiate and recognize an answering action performed by another answerer 2 by shaking his or her answering terminal 100 in a second direction (for example, horizontal direction) based on the angle formed by the second direction (different from the first direction) (for example, horizontal direction), in which the answering terminal 100 was shaken, and the gravity detection direction (vertical direction) (for example, as an angle greater than 45 degrees).

As described above, the answering action differentiating part 13 can be configured to distinguish and differentiate the direction in which the answerers 2 shook the answering terminals 100 using a threshold value for distinction (for example, as an angle of 45 degrees to the vertical direction) based on the gravity detection direction.

The answering action differentiating part 13 shown in FIG. 3 can recognize the direction in which an acceleration of 1 G, or −1 G when the detection direction is opposite, is detected by the acceleration sensors used as the motion sensors 101 (refer to FIG. 4) of the answering terminals 100 as the gravitational acceleration direction when the answering terminals 100 (refer to FIG. 1 and FIG. 2A) are in a stationary state immediately before the answerers 2 (refer to FIG. 1 and FIG. 2A) starts an answering action. Alternatively, the gravitational acceleration detection direction may be recognized when the answering terminals 100 are in a stationary state immediately after the answerers 2 completes an answering action. For example, in the case of a three-axis acceleration sensor, the direction of the detection axis in which the highest gravitational acceleration (closest to 1 G, or −1 G when the detection direction is opposite) is detected among the three acceleration detection axes provided as three axes perpendicular to each other can be determined as the detection axis direction that is closest to the gravitational acceleration direction (in this case, the gravitational accelerations detected in the other detection axis directions are close to 0 G and the other detection axes extend in a direction generally perpendicular to the gravity direction (horizontal direction)). In addition, by comparing the gravitational acceleration detected along the detection axis along which the highest gravitational acceleration is detected (less than 1 G, or less than −1G when the detection direction is opposite) and the gravitational acceleration of 1 G, or −1 G when the detection direction is opposite, the tilt angle of the detection axis along which the highest gravitational acceleration is detected to the gravitational acceleration direction can be calculated to obtain the angle of the detection axis to the gravitational acceleration direction. It is desirable that the motion sensors 101 of the answering terminals 100 are configured to detect not only an answering action but also the gravitational accelerations immediately before or after an answering action. In this way, the gravitational acceleration direction can be recognized.

It is desirable that the answering action differentiating part 13 compares the answering actions to determine the answering action in the dominant direction and adopt it when an answering action is identified as a combination of an answering action of shaking the answering terminal 100 (refer to FIG. 1 and FIG. 2A) in a first direction (for example, vertical direction) and an answering action of shaking the answering terminal 100 in a second direction (for example, horizontal direction) in the differentiation in the answering action differentiating part 13 shown in FIG. 3. For example, it is desirable that an intensity determining part 14B, which is described in detail later, of the differentiation result counting and analyzing part 14 of the answer counting system 10 determines the intensity of the answering actions to determine the dominant direction. Alternatively, a motion counting part 14C, which is described in detail later, of the differentiation result counting and analyzing part 14 of the answer counting system 10 may count the number of repetition in the answering actions to determine the dominant direction. With this configuration, the answering actions of the answerers 2 (refer to FIG. 1 and FIG. 2A) can be suitably distinguished and differentiated.

One reason why the answering actions of the answerers 2 (refer to FIG. 1 and FIG. 2A) are differentiated into two types of answering actions of shaking the answering terminal 100 (refer to FIG. 1 and FIG. 2A) in two predetermined different directions in the answering action differentiating part 13 shown in FIG. 3 is that the polarity of an answer to a question is broadly divided into two polarities linguistically, those of positive and negative. Another reason is that one answering action answerers 2 can perform most precisely without seeing their hands holding the answering terminal 100 is to shake the answering terminal 100 in the direction of gravitational force (vertical direction), and another action answerers 2 holding the answering terminal 100 in one hand can perform relatively precisely without relying on vision is to shake the answering terminal 100 in a direction other than the direction of gravitational force (vertical direction). In either case, the answerers 2 can recognize the direction of gravitational force correctly without relying on vision by holding the answering terminal 100 and supporting the weight of the answering terminal 100 in one hand. Among the answering actions answerers 2 can perform without relying on vision, the answering actions the answerers 2 perform with an awareness of the gravity detection direction based on the weight of the answering terminal 100 are answering actions which can be performed especially easily and accurately.

Similarly, an answering action of, for example, shaking the answering terminal 100 (refer to FIG. 1 and FIG. 2A) at an angle of 45 degrees along a diagonal line connecting the lower-left and upper-right points as viewed from the answerers 2 may be used (used as the first direction, for example) as long as it is an answering action the answerers 2 (refer to FIG. 1 and FIG. 2A) can perform with a sense of direction achieved by recognition of the gravitational acceleration direction without relying on vision. In addition, an answering action of shaking the answering terminal 100 at an angle of −45 degrees along a diagonal line connecting the upper-left and lower-light points as viewed from the answerers 2 may be used (used as the second direction, for example). Further, the vertical direction as viewed from the answerers 2 may be used as a first answering direction in which the answerers 2 should shake the answering terminal 100 and the direction at 45 degrees along a diagonal line connecting the lower-left and upper-right points as viewed from the answerers 2 may be used as a second answering direction in which the answerers 2 should shake the answering terminal 100, for example. Alternatively, the horizontal direction as viewed from the answerers 2 may be used as a first answering direction in which the answerers 2 should shake the answering terminal 100 and the direction at −45 degrees along a diagonal line connecting the upper-left and lower-right points as viewed from the answerers 2 may be used as a second answering direction in which the answerers 2 should shake the answering terminal 100. The opposite combinations of the above may be used.

The differentiation results from the answering action differentiating part 13 on whether the answerers 2 (refer to FIG. 1 and FIG. 2A) shook the answering terminal 100 (refer to FIG. 1 and FIG. 2A) in a first direction (for example, vertical direction (direction of gravitational force)) or a second direction (different from the first direction) (for example, horizontal direction (direction perpendicular to the gravitational force)) can be stored in association with the detection results and terminal codes as described above in the result storing part 15. By storing the differentiation results in association with the detection results and terminal codes in the result storing part 15, the differentiation results, detection results and terminal codes stored in the result storing part 15 can be used to count and analyze the differentiation results as needed.

The differentiation result counting and analyzing part 14 of the answer counting system 10 shown in FIG. 3 can count and analyze the differentiation results differentiated by the answering action differentiating part 13. The differentiation results differentiated by the answering action differentiating part 13 are output as, for example, binary results distinguishing and differentiating whether the answerers 2 (refer to FIG. 1 and FIG. 2A) shook the answering terminal 100 (refer to FIG. 1 and FIG. 2A) in a first direction (for example, vertical direction or horizontal direction) or a second direction (different from the first direction) (for example, horizontal direction or vertical direction). The binary differentiation results, for example, output from the answering action differentiating part 13 correspond to the polarities, positive and negative, of the answers to the question and can be recognized as positive and negative answers from the answerers 2 by the questioner 1 (refer to FIG. 1). In addition, by counting the binary differentiation results, for example, output from the answering action differentiating part 13, the correct count number of answers from many answerers 2 can be achieved. On the other hand, by analyzing in more detail the information included in the detection results associated with the binary differentiation results, for example, having a specific positive or negative answer polarity, the answering actions of the answerers 2 can be analyzed in more detail, as described in detail later, in regard to the detection results associated with binary differentiation results, for example, having a specific positive or negative answer polarity, to understand a more detailed meaning of the answering actions. The count and analysis results counted and analyzed by the differentiation result counting and analyzing part 14 can be also stored in association with the differentiation results, detection results and terminal codes in the result storing part 15. Thus, the information of the count and analysis results, the differentiation results, and the detection results and terminal codes stored in the result storing part 15 can be used in the answer counting system 10 as needed.

A displaying part 17 of the answer counting system 10 shown in FIG. 3 can display the count and analysis results counted and analyzed in the differentiation result counting and analyzing part 14. The questioner 1 (refer to FIG. 1) can understand the full scope and details of the answers from a multiplicity of answerers 2 (refer to FIG. 1 and FIG. 2A) with reference to the count and analysis results counted and analyzed in the differentiation result counting and analyzing part 14 and displayed on the displaying part 17. The displaying part 17 of the answer counting system 10 according to this embodiment has a liquid crystal display (not shown) as a display device. The displaying part 17 may have a plasma display for higher visibility or may have an organic electroluminescent display to eliminate a backlight that is necessary in a liquid crystal display for further weight reduction.

The displaying part 17 shown in FIG. 3 may not make a visual representation but make an audio representation. For example, the questioner 1 (refer to FIG. 1) delivers a lecture wearing an earphone as an audio representation part (not shown). An advantage of visual representation is that the questioner 1 can recognize the information in a moment and can get information without being disturbed by noise in the seminar site. The audio representation informs the questioner 1 of the result of counting by synthesized voice, such as "the number of votes for yes is 55," or "the number of votes for no is 45." In the case of an audio representation, the questioner 1 can deliver a lecture and ask a question without looking away from the audience (answerers 2 (refer to FIG. 1 and FIG. 2A)).

The differentiation result counting and analyzing part 14 shown in FIG. 3 has an answering action counting part 14A for counting the answering actions performed by the answerers 2 (refer to FIG. 1 and FIG. 2A) by shaking the answering terminal 100 (refer to FIG. 1 and FIG. 2A) in a first direction (for example, vertical direction) and a second direction (for example, horizontal direction) and differentiated by the answering action differentiating part 13 without duplication in each group grouped by the grouping part 12 based on the terminal codes. Some answerers 2 may perform a plurality of answering actions with different answer polarities in response to one question from the questioner 1 (refer to FIG. 1) because they change their mind after performing an answering action or correct their answer after performing a wrong answering action. Some answerers 2 may perform an answering action with an answer polarity a plurality of times in response to one question from the questioner 1 on concern that their answering actions are too subtle to be differentiated correctly by the answer counting system 10. The answering action counting part 14A of the differentiation result counting and analyzing part 14 can count the answers in each group grouped by the grouping part 12 without duplication of answers with the same terminal codes so that the answers to one question from the questioner 1 grouped by the grouping part 12 can be counted correctly. To exclude duplicate answers in the counting in the answering action counting part 14A, the answering action counting part 14A may be configured to count only the answering action (differentiation result, detection result and terminal code) received last by the receiving part 11, for example, when a plurality of answering actions (differentiation results, detection results and terminal codes) have been transmitted from the same answering terminal 100 individually identified by a terminal code. The answering action counting part 14A can output a correct count number of answers without duplicate answers as a count and analysis result. Thus, the answer counting system 10 can count the answers accurately, excluding duplicate answers from the same answerer 2. In addition, some answerers 2 who answer in favor, for example, may shake the answering terminal 100 in the positive direction relatively strongly or shake the answering terminal 100 strongly many times in the positive direction to indicate their strong approval even though shaking the answering terminal 100 once in the positive direction is enough to accomplish their purpose. With the above configuration, duplicate answers from the same answerers 2 can be excluded even in the above case.

The differentiation result counting and analyzing part 14 shown in FIG. 3 has an intensity determining part 14B which can quantitatively determine the intensities of the answering actions performed by the answerers 2 (refer to FIG. 1 and FIG. 2A) by shaking the answering terminal 100 (refer to FIG. 1 and FIG. 2A) in a first direction (for example, vertical direction) or second direction (for example, horizontal direction) and differentiated by the answering action differentiating part 13. The intensity determining part 14B of the differentiation result counting and analyzing part 14 can quantitatively recognize the degree of positivity or negativity of the differentiation results by analyzing the detection results associated with a binary differentiation result, for example, having a specific positive or negative answer polarity. For example, the intensity determining part 14B may be configured to be able to analyze the information of physical quantity, such as acceleration, velocity or displacement, quantitatively indicating the motion of an answering action of an answerer 2, included in a detection result associated with, for example, binary differentiation result and determine it quantitatively as a quantity indicating the intensity of, for example, a specific binary differentiation result having a positive or negative answer polarity. Thus, by quantitatively comparing the detection result about the answering action of one answerer 2 and the detection results about the answering actions of other answerers 2 differentiated as, for example, binary differentiation results having the same positive or negative answer polarity by the answering action differentiating part 13, the intensity determining part 14B can output a count and analysis result indicating that the one answerer 2 made a more positive answer to a question from the questioner 1 (refer to FIG. 1) than other answerer 2, for example. Thus, the intensity determining part 14B can identify and extract the terminal codes of top ten answerers 2 who made the most positive answering actions in the descending order of intensity and the terminal codes of top ten answerers 2 who made the most negative answering actions in the descending order of intensity among the answering actions performed by a multiplicity of answerers 2 to answer a specific question from the questioner 1, for example.

In addition, the functions of the intensity determining part 14B and the differentiation result counting and analyzing part 14 shown in FIG. 3 can be used to exclude duplicate answers efficiently. Because the intensity determining part 14B is provided, the differentiation result counting and analyzing part 14 may be configured to determine the intensities of the answering actions and adopt an answering action with the highest intensity on shaking when a plurality of answers are received from the same answerers 2 (refer to FIG. 1 and FIG. 2A). With this configuration, the case where the answerers 2 shook the answering terminal 100 accidentally with no intention of answering can be excluded. This is because the answerers 2 shake the answering terminal 100 relatively weakly when they shake the answering terminal 100 accidentally. In addition, when the answerers 2 perform an answering action again to correct the answer because they changed their mind or made a mistake, it is on the psychology of the answerers 2 to shake the answering terminal 100 relatively strongly. Thus, by adopting an answering action with the highest intensity, duplicate answers from the same answerers 2 can be excluded in counting the answers.

The differentiation result counting and analyzing part 14 shown in FIG. 3 has an motion counting part 14C for counting the number of repetitive motions in at least one of answering actions of shaking the answering terminal 100 (refer to FIG. 1 and FIG. 2A) in a first direction (for example, vertical direction) and a second direction (for example, horizontal direction) performed by the same answerers 2 (refer to FIG. 1 and FIG. 2A) and differentiated by the answering action differentiating part 13. The motion counting part 14C can count the number of repetitive motions made by an answerer 2 in succession in one answering action by analyzing the detection result associated with a binary differentiation result, for example, having a specific positive or negative answer polarity and differentiated by the answering action differentiating part 13. For example, the motion counting part 14C can extract points at which the velocity is 0 (zero) (starting and turning points) in an answering action of an answerer 2 including repetitive motions and count the number of the points by analyzing and recognizing information of a physical quantity, such as acceleration, velocity or displacement, quantitatively indicating the repetitive motions in a series of the answering action of the answerer 2 and included in a detection result associated with a differentiation result. When an answerer 2 performs a series of the answering action by shaking the answering terminal 100 repeatedly in a specific direction, the half of the number of the points extracted and counted at which the velocity is 0 (zero) (starting and turning points) may be deemed to be equal to the number of times the answerer 2 shook the answering terminal 100 successively and repeatedly.

Alternatively, when the number of times the answering terminal 100 is shaken is used as an answer, it is on the psychology of the answerers 2 (refer to FIG. 1 and FIG. 2A) to give a strong down stroke and then make a quick up stroke when they shakes the answering terminal 100 in a vertical direction. In this case, the upward acceleration is maximum at the bottom dead point as viewed from the answerers 2. The maximum acceleration may be detected and counted as one motion. All the repetitive motions made by the answerers 2 may be once stored to determine whether the motions of the answerers 2 are duplicate answers as described above or repetitive motions to be counted. In this case, the questioner 1 (refer to FIG. 1) determines whether the answering actions are answering actions performed in response to a question requiring an answer of "Yes" or "No" or answering actions preformed to indicate the number of repetition by clicking a selectable decision button (not shown) or using a display information selecting part 16, which is described later, in view of the type of the question.

When the motion sensors 101 (refer to FIG. 4) of the answering terminals 100 (refer to FIG. 1 and FIG. 2A) are acceleration sensors, for example, the motion counting part 14C can integrate the acceleration information detected by the motion sensors 101 once with respect to the time obtained based on the sampling frequency of the acceleration sensors to obtain the corresponding information of velocity. Alternatively, when the motion sensors 101 are velocity sensors, the velocity information detected by the velocity sensors can be directly used. Whether the motions of an answerer 2 (refer to FIG. 1 and FIG. 2A) are a series of motions included in an answering action or inconsecutive answering actions can be determined by providing an appropriate threshold value (for example, one second) on which the determination is based regarding how long the velocity of the answering action obtained by analysis can continue to be 0 (zero).

In this case, the motions can be determined to be inconsecutive answering actions when the periods in which the velocity of the answering action is 0 (zero) are equal to or longer than one second, and the motions can be determined to be a series of motions included in an answering action when the periods in which the velocity of the answering action is 0 (zero) are shorter than one second, for example. The number of repetitive motions counted by the motion counting part 14C can be used as an arbitrary number responded together with a positive or negative answer by the answerers 2 to indicate the reason for the answer, for example, between the questioner 1 (refer to FIG. 1) and the answerers 2 (refer to FIG. 1 and FIG. 2A). For example, when an answerer 2 chooses, in addition to an answer having a positive or negative polarity, the third option out of the five numbers prepared by the questioner 1 that indicates the reasons for the answer to select the reason for the answer, the answerer 2 can use the number of repetitive motions included in the answering action. In this case, the answerer 2 shakes the answering terminal 100 (refer to FIG. 1 and FIG. 2A) in the direction having the positive or negative answer polarity (for example, vertical direction or horizontal direction) three times in a row, for example. The number of times of repetitive motions in an answering action analyzed and counted by the motion counting part 14C is output as a count and analysis result.

The differentiation result counting and analyzing part 14 shown in FIG. 3 has a trajectory determining part 14D which can determine the trajectories of the answering actions performed by the answerers 2 (refer to FIG. 1 and FIG. 2A) by shaking the answering terminal 100 (refer to FIG. 1 and FIG. 2A) in a first direction (for example, vertical direction) or second direction (for example, horizontal direction) and differentiated by the answering action differentiating part 13. The trajectory determining part 14D can analyze the trajectories of detection results about answering actions of drawing a given letter or figure (for example, the figure "8" as shown in FIG. 2C) with the answering terminals 100 performed by the answerers 2 following answering actions with a positive or negative polarity performed by the answerers 2 by shaking the answering terminals 100 in a first direction (for example, vertical direction) or a second direction (for example, horizontal direction), and determine and recognize the letters drawn with the answering terminals 100.

When the motion sensors 101 (refer to FIG. 4) of the answering terminals 100 (refer to FIG. 1 and FIG. 2A) are acceleration sensors, velocity sensors or position sensors, for example, the positions of the answering terminals 100 and the trajectories of the movement of the answering terminals 100 can be recognized based on the detection results about information of acceleration, velocity or position from the sensors. For example, information about the position of the answering terminal 100 can be obtained by integrating information of acceleration detected by an acceleration sensor twice with respect to the time obtained based on the sampling frequency of the acceleration sensor. Similarly, information about the position of the answering terminal 100 can be obtained by integrating information of velocity detected by a velocity sensor once with respect to the time obtained based on the sampling frequency of the acceleration sensor. On the other hand, the determination in the trajectory determining part 14D about a given letter or figure drawn by answerers 2 (refer to FIG. 1 and FIG. 2A) with the answering terminals 100 can be made using optical character recognition (OCR), for example. Thus, the answerers 2 can present information of trajectories, such as text, represented by a given string of letters or a figure the answerers 2 draw with the answering terminals 100 to the questioner 1 (refer to FIG. 1) as a response in addition to an answer having a positive or negative polarity.

As described above, when the trajectory determining part 14D shown in FIG. 3 can determine the trajectories of answering actions performed by the answerers 2 (refer to FIG. 1 and FIG. 2A) with optical character recognition (OCR) to determine a letter or figure drawn by the answerers 2 with the answering terminals 100 (refer to FIG. 1 and FIG. 2A), the answerers 2 can transmit various requests, such as a reverse question or suggestion from the answerers 2 to the questioner 1 (refer to FIG. 1), to the questioner 1. Thus, when a question-and-answer session is held using the answering terminals 100 and the answer counting system 10 of this embodiment, the answerers 2 not only can make an answer by selecting one of answer options presented by the questioner 1 but also can have a reverse question-and-answer session in which the answerers 2 ask questions to the questioner 1. Thus, according to this embodiment, the questioner 1 and the answerers 2 can have a more interactive question-and-answer session. The information of trajectories of answering actions drawn by the answerers 2 with the answering terminals 100 and determined by the trajectory determining part 14D is output as a count and analysis result.

The answer counting system 10 shown in FIG. 3 has a display information selecting part 16 for selecting information to be displayed on the displaying part 17 from the count and analysis results counted and analyzed in the differentiation result counting and analyzing part 14. Thus, the display information selecting part 16 can select information from the count and analysis results counted and analyzed in the differentiation result counting and analyzing part 14 to be displayed on the displaying part 17. Thus, the answer counting system 10 can selectively display the count and analysis results output from each of the differentiation result counting and analyzing part 14, the answering action counting part 14A, the intensity determining part 14B, the motion counting part 14C and the trajectory determining part 14D as described above according to the needs of the questioner 1 (refer to FIG. 1) on the displaying part 17 and present it to the questioner 1. For example, the questioner 1 can display only the counted number of positive answers (for example, answering action performed by shaking the answering terminal 100 (refer to FIG. 1 and FIG. 2A) in the vertical direction) from the answerers 2 (refer to FIG. 1 and FIG. 2A) on the displaying part 17. Alternatively, the questioner 1 can display only the terminal codes of the answerers 2 who performed an answering action of shaking the answering terminal 100 in a circle (in which the answerers 2 perform to make a request for a question reversely to the questioner 1) on the displaying part 17 and call on the answerers 2 to allow them to ask a reverse question. Alternatively, the questioner 1 can display only the terminal codes of the answerers 2 who performed an answering action of drawing a figure "8" with the answering terminal 100 (in which the answerers 2 perform to propose a suggestion to the questioner 1) and call on the answerers 2 to allow them to make a suggestion.

The use of the answer counting system 10 shown in FIG. 3 and the answering terminals 100 (refer to FIG. 4) of this embodiment enables the questioner 1 (refer to FIG. 1) and the answerers 2 (refer to FIG. 1 and FIG. 2A) to have a continuous and interactive question-and-answer session in which the answerers 2 can also provide information in contrast to a discontinuous and one-way question-and-answer session method in a conventional question-and-answer session. For example, a speaker of a seminar as the questioner 1 (refer to FIG. 1) can ask seminar participants as the answerers 2 (refer to FIG. 1 and FIG. 2A) a general question such as, "Are you satisfied with the contents of the seminar?" In this case, the speaker can determine a rule in answering (an answering action in making a positive answer) that the participants should shake the answering terminal 100 in a vertical direction when they thought something was interesting or when they thought they heard something good and tell it to the participants. The speaker can also determine a rule in answering (an answering action in making a negative answer) that the participants should shake the answering terminal 100 to the right and left when they thought they did not understand what the speaker was saying or found it boring, or when they thought they had a question.

In such a case, the use of the answer counting system 10 shown in FIG. 3 and the answering terminals 100 (refer to FIG. 4) of this embodiment enables the speaker as the questioner 1 (refer to FIG. 1) to know whether the participants as the answerers 2 (refer to FIG. 1 and FIG. 2A) are evaluating the current content of the lecture positively or negatively at any time. Thus, when the speaker knew that many participants made a negative answer, for example, he or she can give additional explanation for easier understanding or change the subject. On the other hand, the participants can inform the speaker that they want an easier explanation or want the speaker to change the subject at any time without being known by the other participants. In this way, the answer counting system 10 and the answering terminals 100 of this embodiment can be used as interactive communication tools which connect the questioner 1 and answerers 2 in an academic presentation, lecture at university, business presentation, workshop, recital or concert.

Each of the receiving part 11, the grouping part 12, the answering action differentiating part 13, the differentiation result counting and analyzing part 14, the display information selecting part 16 and the displaying part 17 of the answer counting system 10 shown in FIG. 3 is provided with a random access memory 18 as a short-term storage device for assisting information processing therein, and the answer counting system 10 is provided with a central processing unit 19 for comprehensively controlling the information processing in the answer counting system 10. With this configuration, the answer counting system 10 can receive detection results about answering actions of the answerers 2 detected by the motion sensors 101 (refer to FIG. 4) of the answering terminals 100 and the terminal codes stored in the terminal code storing parts 103 (refer to FIG. 4) of the answering terminals 100, which are transmitted from the answering terminals 100 (refer to FIG. 1 and FIG. 2A) operated by the answerers 2 (refer to FIG. 1 and FIG. 2A), with the receiving part 11, group the detection results as a group of answers to one question from the questioner 1 (refer to FIG. 1) and terminal codes with the grouping part 12, differentiate the detection results and outputs differentiation results having an positive or negative answer polarity with the answering action differentiating part 13, count and analyze the differentiation results and outputs count and analysis results with the differentiation result counting and analyzing part 14, select a count and analysis result the questioner 1 wants to display with the display information selecting part 16 as needed, and display the selected count and analysis result on the displaying part 17.

Figure 4:
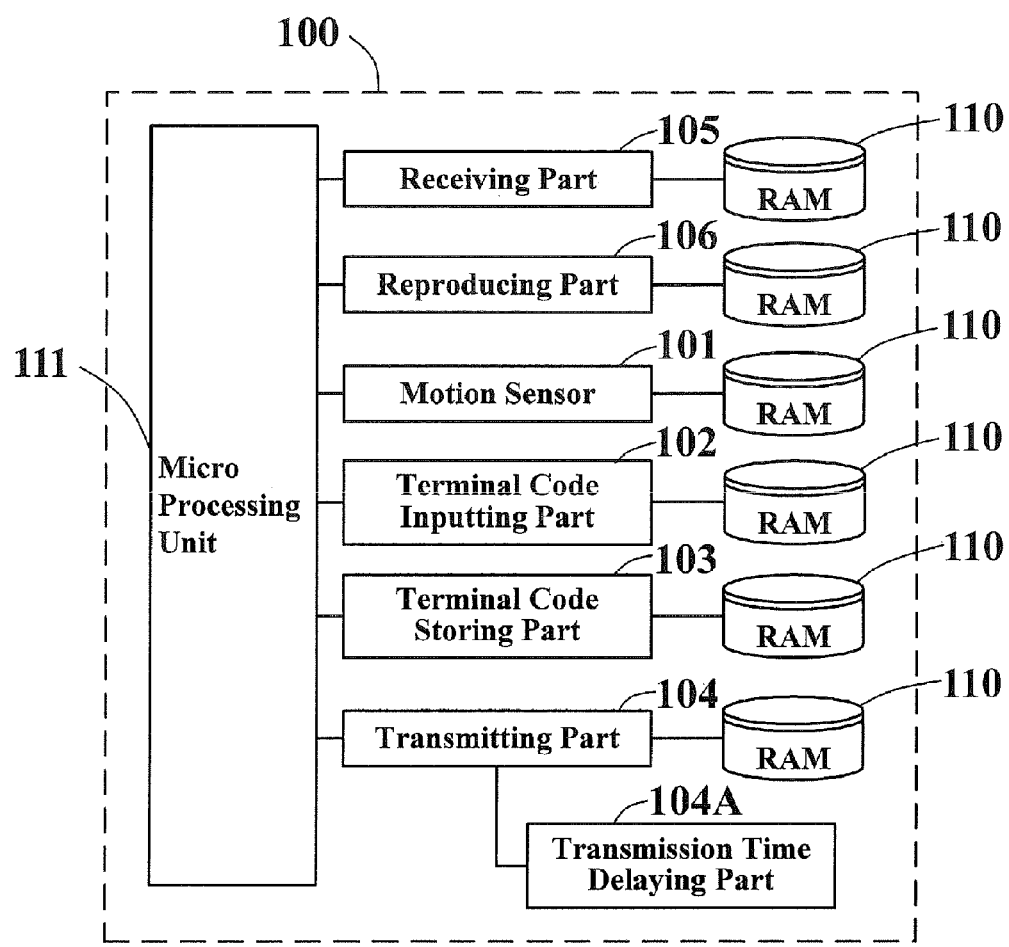
FIG. 4 is a block diagram illustrating the configuration of the answering terminal according to the first embodiment of the present invention.

Next, FIG. 4 is a block diagram illustrating the configuration of the answering terminal 100 according to the first embodiment of the present invention. The answering terminal 100 shown in FIG. 4 has a motion sensor 101 (refer to FIG. 4) for detecting an answering action an answerer 2 (refer to FIG. 1 and FIG. 2A) performs in response to a specific question from the questioner 1 (refer to FIG. 1) and outputting the answering action as a detection result detected with the distinction between a first direction (for example, vertical direction or horizontal direction) and a second direction (different from the first direction) (for example, horizontal direction or vertical direction). The motion sensor 101 may typically be an acceleration sensor which can also detect the direction of gravitational force of the earth. For example, an capacitive acceleration sensor resin-sealed in a semiconductor package which can detect three-axis three-degree-of-freedom accelerations in the Cartesian coordinate system may be used as the motion sensor 101. An acceleration and angular acceleration sensor with three axes and six degrees of freedom in the Cartesian coordinate system, which can detect accelerations and angular accelerations with more degrees of freedom (channels), may be used as the motion sensor 101. The motion sensor 101 is fixedly provided in the answering terminal 100 having such size and weight that the answerers 2 can hold and operate it with one hand.

Here, as shown in FIG. 4, the motion sensor 101 may detect at least two directions, an up-down direction (vertical direction (gravitational acceleration direction)) as a first direction and a left-right (lateral) direction (as x direction among horizontal direction) as a second direction. In other words, the motion sensor 101 may be a two-axis (two-dimensional) sensor having detection axes in two directions. The motion sensor 101 can detect the direction of the gravitational acceleration as described above and use it as a reference to distinguish between the first and second directions. A three-axis (three-dimensional) sensor which can also detect a forward-back (longitudinal) direction (a direction orthogonal to the left-right (lateral) direction in a horizontal plane) as a third direction may be used. In this way, the types of answering actions can be increased and a more complicated intention can be expressed by a simple action of shaking the answering terminal 100.

As described above, the most accurate answering actions having a linguistic positive or negative answer polarity that the answerers 2 (refer to FIG. 1 and FIG. 2A) holding the answering terminal 100 shown in FIG. 4 in one hand to perform an answering action can perform without relying on vision are an answering action of shaking the answering terminal 100 in the gravitational acceleration direction and an answering action of shaking the answering terminal 100 in a direction different from the gravitational acceleration direction. The motion sensor 101 can typically detect the two types of answering actions distinctively that the answerers 2 can perform most accurately. It is desirable that the motion sensor 101 is able to detect the gravitational acceleration direction in the space on the earth in which the answerers 2 perform an answering action. The motion sensor 101 may detect an answering action of an answerer 2 using a velocity sensor or position sensor. In this case, the detection result about the answering action of the answerer 2 detected by the velocity sensor or position sensor may be output together with gravitational force direction indicating information which indicates which direction, as viewed from the answerer 2, was regarded as the gravitational acceleration direction by the velocity sensor or position sensor when the answering action of the answerer 2 was detected.

According to this embodiment shown in FIG. 4, the motion sensor 101 of the answering terminal 100 can detect the intensity of the answering action of the answerer 2 (refer to FIG. 1 and FIG. 2A). For example, the motion sensor 101 is configured to output the detection result about the answering action of the answerer 2 detected by the motion sensor 101 together with information of a physical quantity, such as acceleration, velocity or displacement, which quantitatively indicates the motion of the answering action of the answerer 2. Thus, as described above, the intensity determining part 14B (refer to FIG. 3) of the differentiation result counting and analyzing part 14 (refer to FIG. 3) of the answer counting system 10 (refer to FIG. 3) can quantitatively compare the answering action of one answerer 2 with the answering actions of other answerers 2 and determine the intensity of the answering action by quantitatively analyzing and determining the detection results from the motion sensors 101.

As shown in FIG. 4, the answering terminal 100 has a terminal code inputting part 102 through which a terminal code by which the answering terminal 100 can be individually identified and differentiated can be input into the answering terminal 100. The terminal code can be provided as a string of letters including symbols or the like so that a multiplicity of answerers 2 (refer to FIG. 1 and FIG. 2A) may not have duplicate terminal codes and can be individually identified and differentiated. It is desirable that terminal codes formed according to a specific rule which is easy to understand for the one questioner 1 (refer to FIG. 1) are input in the answering terminals 100 in advance so that the questioner 1 can read and recognize the terminal codes, by which a multiplicity of answerers 2 can be individually differentiated, displayed on the displaying part 17 (refer to FIG. 3) of the answer counting system 10 (refer to FIG. 1 and FIG. 3). For example, the entry serial numbers for an academic presentation, seminar, business presentation or workshop, or student numbers for checking attendance in a lecture at a university may be used as the terminal codes. Alternatively, in a survey conducted on an unspecified number of answerers 2 via an information communication network, such as the Internet, answerer serial numbers issued to a multiplicity of answerers 2 individually and sequentially according to a specific rule may be used as the terminal codes.

As shown in FIG. 4, the terminal code inputting part 102 of the answering terminal 100 may have an input interface, such as a hardware keyboard and software keyboard, or a QR code reader using a bar-code reader, or an optical image pickup device (camera). Alternatively, each answerer 2 (refer to FIG. 1 and FIG. 2A) may download a terminal code from the answer counting system 10 (refer to FIG. 1 and FIG. 3) through infrared communication or wireless communication, or information communication via an information communication network, such as the Internet, by operating the terminal code inputting part 102. In this case, the answer counting system 10 has a terminal code transmitting part (not shown) for transmitting a terminal code to the terminal code inputting part 102 operated by the answerer 2, and the terminal code inputting part 102 may have a terminal code receiving part (not shown) for downloading and receiving a terminal code from the terminal code transmitting part of the answer counting system 10. This configuration enables the answerer 2 to input a terminal code more easily by which the answering terminal 100 can be individually identified and differentiated via the terminal code inputting part 102. When cellular phones are used as the answering terminals 100 as described above, there is no need to allocate new terminal codes when the telephone numbers of the cellular phones are used as the terminal codes.

As shown in FIG. 4, in a specific example in which a terminal code is input through the terminal code inputting part 102, the answerer 2 (refer to FIG. 1 and FIG. 2A) as a listener of an academic presentation can input the entry serial number issued to control the participants in the academic presentation in which the answerer 2 participates into the answering terminal 100 of the answerer 2 as a terminal code with a software keyboard (not shown) of the terminal code inputting part 102. In another example, a multiplicity of answering terminals 100 which are prepared by the questioner 1 (refer to FIG. 1) as a presenter of an academic presentation and into which the questioner 1 has input terminal codes which are easy to differentiate for the questioner 1 through a bar-code reader (not shown) of the terminal code inputting part 102 of each answering terminal 100 may be handed out and lent to a multiplicity of answerers 2 as listeners of the academic presentation.

As shown in FIG. 4, the terminal code storing part 103 of the answering terminal 100 can store the terminal code, by which the answering terminal 100 can be individually identified and differentiated, input through the terminal code inputting part 102. In addition, the terminal code storing part 103 can provide the information of the terminal code stored in the terminal code storing part 103 to the transmitting part 104 shown in FIG. 4 in response to a request from the transmitting part 104. The terminal code storing part 103 may typically be a small-sized short-term information storage device, such as a read-only memory (ROM) or random access memory (RAM).

As shown in FIG. 4, the transmitting part 104 of the answering terminal 100 is a transmission device for transmitting the detection result about an answering action of the answerer 2 (refer to FIG. 1 and FIG. 2A) detected by the motion sensor 101 in association with the terminal code stored in the terminal code storing part 103 to the answer counting system 10 (refer to FIG. 1 and FIG. 3). For example, the transmitting part 104 may be configured to associate the detection result about an answering action of the answerer 2 detected by the motion sensor 101 with the terminal code stored in the terminal code storing part 103 to create a data file for transmission and transmit the created data file for transmission to the receiving part 11 of the answer counting system 10 (refer to FIG. 3).

As shown in FIG. 4, the transmitting part 104 has a transmission time delaying part 104A that is configured to delay the time of transmission from the time when the motion sensor 101 detects an answering action of the answerer 2 (refer to FIG. 1 and FIG. 2A) by a predetermined delay time. Thus, different delay times may be provided to the answering terminals 100 with reference to the terminal codes stored in the terminal code storing part 103 to avoid congestion in information communication between the transmitting part 104 and the receiving part 11 (refer to FIG. 3) of the answer counting system 10 (refer to FIG. 1 and FIG. 3), for example. In a question-and-answer session between one questioner 1 (refer to FIG. 1) and a multiplicity of answerers 2 in which the answering terminals 100 according to this embodiment are used, a multiplicity of answerers 2 simultaneously make an answer with the answering terminals 100 in response to a question from the questioner 1. The answering terminals 100 according to this embodiment can be used in a question-and-answer session in a recital or concert in which quite a few, such as a few thousand, answerers 2 participate. In such a case, however, severe information communication congestion may occur in the information communication network in the recital or concert site or the answer counting system 10. Thus, the question-and-answer session between the questioner 1 and the answerers 2 may be interfered with.

As shown in FIG. 4, the transmission time delaying part 104A of the transmitting part 104 is configured such that even when the transmitting parts 104 of a multiplicity of answering terminals 100 attempt to conduct transmission generally simultaneously, for example, predetermined different delay times are allocated to different answering terminals 100 based on the information of terminal codes so that the answering terminals 100 can conduct transmission sequentially. For example, because different terminal codes include different information so that all the answering terminals 100 can be individually identified and differentiated, all the answering terminals 100 can be provided with different delay times when the transmission time delaying part 104A determines a delay time that is calculated based on a specific calculation criterion according to the content of the information of the terminal code. For example, when the terminal codes are made up of a string of English letters, numbers that can be used to allocate different delay times to all the answerers 2 can be obtained by converting the alphabets into numbers 1 to 26 according to the alphabetical order and obtaining the sum of the converted numbers. The delay time may be calculated by multiplying the sum by a transmission time that can be given to one answering terminal 100 (for example, 0.2 seconds). The calculation criterion for the delay time can be determined in advance in view of the processing capacity or the like of the answer counting system 10 (refer to FIG. 1 and FIG. 3).

As shown in FIG. 4, each of the motion sensor 101, the terminal code inputting part 102, the terminal code storing part 103 and the transmitting part 104 of the answering terminal 100 is provided with a random access memory 110 as a short-term information storage device for assisting information processing therein, and the answering terminal 100 is provided with a microprocessor 111 for comprehensively controlling the information processing in the answering terminal 100. With this configuration, the answering terminal 100 can output an answering action performed by the answerer 2 (refer to FIG. 1 and FIG. 2A) in response to a question from the questioner 1 (refer to FIG. 1) as a detection result detected by the motion sensor 101 with a distinction between a first direction (for example, vertical direction or horizontal direction) and a second direction (different from the first direction) (for example, horizontal direction or vertical direction), store a terminal code by which the answering terminal 100 can be individually identified and differentiated and which is input through the terminal code inputting part 102 in the terminal code storing part 103, and transmit the detection result about the answering action of the answerer 2 detected by the motion sensor 101 in association with the terminal code stored in the terminal code storing part 103 to the answer counting system 10 (refer to FIG. 1 and FIG. 3) with a time difference determined by the transmission time delaying part 104A of the transmitting part 104 based on a predetermined delay time with the transmitting part 104. Thus, when the answerers 2 and the questioner 1 have a direct question-and-answer session in the same space and time, the answerers 2 can answer a question from the questioner 1 properly using the answering terminals 100 of this embodiment.

As shown in FIG. 4, the answering terminal 100 also has a receiving part 105 and a reproducing part 106. In this embodiment, the answering terminals 100 can be used when the answerers 2 (refer to FIG. 1 and FIG. 2A) and the questioner 1 (refer to FIG. 1) have a direct question-and-answer session in the same space and time. In addition, even when the answerers 2 and the questioner 1 have a question-and-answer session in shared time but in a spatially separated manner, the answerers 2 can properly answer a question from the questioner 1 using the answering terminal 100 according to this embodiment. The answering terminal 100 can receive information including a question from one questioner 1 who asks the question at a position remote from the places where the answerers 2 answer with the receiving part 105, and reproduce the received information including a question with the reproducing part 106.

As shown in FIG. 4, the receiving part 105 of the answering terminal 100 can be provided as an information communication device that is capable of performing information communication via an information communication network, such as the Internet. For example, the receiving part 105 can perform information communication with a transmitting part (not shown) of the answer counting system 10 (refer to FIG. 1 and FIG. 3) to receive information including a question. Alternatively, the receiving part 105 may have a television tuner or radio tuner for receiving information including a question via television or radio airwaves so that it can receive information which includes a question and is transmitted through broadcasting.

As shown in FIG. 4, the reproducing part 106 of the answering terminal 100 is a reproducing device for reproducing and presenting to the answerer 2 (refer to FIG. 1 and FIG. 2A) information which includes a question and is received by the receiving part 105. The reproducing part 106 had a liquid crystal display (not shown) and an air borne speaker (not shown), and can present information including a question from the questioner 1 (refer to FIG. 1) (recorded information of the questioner 1 asking a question, for example) to the answerer 2 with video and sound. Alternatively, the reproducing part 106 may reproduce information which includes a question from the questioner 1 and is recorded in an arbitrary information recording medium, such as a memory card, and may present to the answerer 2 the reproduced information. The reproducing part 106 may have a plasma display instead of the liquid crystal display (not shown) for higher visibility or may have an organic electroluminescent display to eliminate a backlight that is necessary in a liquid crystal display for further weight reduction. The reproducing part 106 may have a bone conduction speaker so that the answerer 2 can also hear ambient sound when he or she reproduces and views information including a question.

With this configuration, the answering terminals 100 of this embodiment shown in FIG. 4 and the answer counting system 10 (refer to FIG. 1 and FIG. 3) not only enables the answerers 2 (refer to FIG. 1 and FIG. 2A) and the questioner 1 (refer to FIG. 1) to have a direct question-and-answer session properly in the same space and time but also enables the answerers 2 and the questioner 1 to have a question-and-answer session properly in sharing time but in a spatially separated manner.

Figure 5:
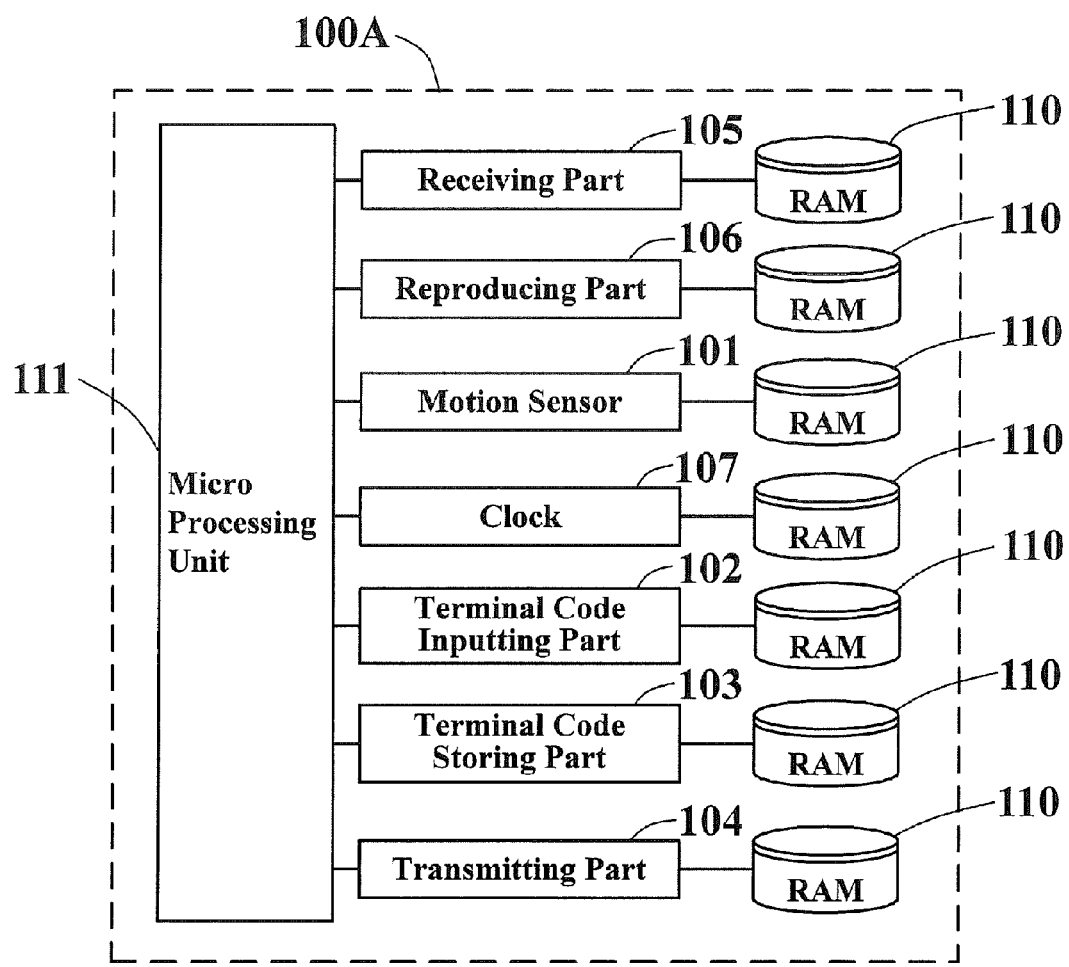
FIG. 5 is a block diagram illustrating the configuration of the answering terminal according to a second embodiment of the present invention.

As shown in FIG. 5, an answering terminal 100A according to a second embodiment of the present invention has a clock 107 in addition to the configuration of the answering terminal 100 according to the first embodiment of the present invention (refer to FIG. 4). The clock 107 of the answering terminal 100A as shown in FIG. 5 is configured to output a detection time when the motion sensor 101 detected an answering action of the answerer 2 (refer to FIG. 1 and FIG. 2A) on the time scale of the period in which information presentation made in real time by the questioner 1 (refer to FIG. 1) to present information including a question to be reproduced by the reproducing part 106. The detection time output from the clock 107 is transmitted in association with a detection result detected by the motion sensor 101 and the terminal code stored in the terminal code storing part 103 to the answer counting system 10 (refer to FIG. 1 and FIG. 3) by the transmitting part 104. This is to enable the answer counting system 10 to accurately recognize the time when the answerer 2 answered on the time scale of the period in which information presentation made in real time by the questioner 1 to present the information including a question proceeded even when the questioner 1 and the answerers 2 have a question-and-answer session in a temporally separated manner.

As shown in FIG. 5, the clock 107 is configured to output a time along the time in which information presentation made in real time by the questioner 1 (refer to FIG. 1) to present the information including a question. Information including a question is reproduced and presented to the answerer 2 (refer to FIG. 1 and FIG. 2A) by the reproducing part 106, but the answerer 2 may reproduce the information including a question at fast speed for example, by operating the reproducing part 106 according to a given reproducing procedure. In this case, the answerer 2 answers the question at a time with a time difference from the time in which the information presentation made in real time by the questioner 1 to present the information including a question. The clock 107 outputs a detection time along the time in which information presentation made in real time by the questioner 1 to present the information including a question proceeded so that the time when the questioner 1 asked a question and the time when the answerer 2 answered can be recognized in a synchronized manner. For example, when the answerer 2 reproduces information including a question at fast speed by operating the reproducing part 106, the time which is output from the clock 107 will be also fast-forwarded together with the time in which the presentation of the information including a question proceeded so that the time when the questioner 1 asked a question and the time when the answerer 2 answered can be kept synchronized.

As shown in FIG. 5, the detection time output from the clock 107 and transmitted to the answer counting system 10 (refer to FIG. 1 and FIG. 3) by the transmitting part 104 is used in the grouping to form a group of answers (detection results and terminal codes) to one question from the questioner 1 (refer to FIG. 1) by the grouping part 12 (refer to FIG. 3) of the answer counting system 10. The grouping part 12 is configured to group answers (to one question from the questioner 1) (detection results, detection times and terminal codes) using the detection times output from the clocks 107 instead of the times when the receiving part 11 (refer to FIG. 3) of the answer counting system 10 received the detection results (receipt times), which are used as reference times in grouping answers (detection results and terminal codes) when the questioner 1 and the answerers 2 are having a direct question-and-answer session, when the questioner 1 and the answerers 2 have a question-and-answer session in a temporally separated manner.

By configuring the answering terminal 100A of this embodiment shown in FIG. 5 and the answer counting system 10 (refer to FIG. 1 and FIG. 3) as described above, a question-and-answer session can be carried out without no difficulty even when answerers 2 (refer to FIG. 1 and FIG. 2A) temporally separated the questioner 1 have a question-and-answer session by receiving information including a question with the receiving part 105 at a given time point with a time difference from the time when the questioner 1 (refer to FIG. 1) asked a question. In one example, answerers 2 temporally separated from the questioner 1 can receive information including a question from the questioner 1 with the receiving part 105 as needed through streaming via an information communication network, such as the Internet, and reproduce it with the reproducing part 106. Even in this case, the clock 107 can properly output a detection time in synchronization with the time in which information presentation made in real time by the questioner 1 to ask a question proceeded. Thus, the answerers 2 can freely perform reproduction operations such as fast-forward and fast-rewind while reproducing information including a question and answer to the question.

In a more specific example, the use of the answering terminals 100A of this embodiment shown in FIG. 5 and the answer counting system 10 (refer to FIG. 1 and FIG. 3) enables an instructor of a distance (remote) education program as the questioner 1 (refer to FIG. 1) to know the degree of understanding of the learners of the distance education program as the answerers 2 (refer to FIG. 1 and FIG. 2A) properly, for example. For example, the instructor of a distance education program can ask a general question, such as "Do you understand the content of the lecture?" to the learners of the distance education program. In addition, the instructor can determine rules, such as the learners should shake the answering terminal 100A in a vertical direction when they think they understand it well or when they found it interesting, and the learners should shake the answering terminal 100A in a lateral (left-right) direction when they do not understand or when they found it difficult, and present the rules to the learners in the distance education program. In response to this, the learners can make an answer to the instructor about their degree of understanding of a specific content in the distance education program specified by the detection time output from the clock 107 of the answering terminal 100A as needed.

The answers from the learners of the distance education program as the answerers 2 (refer to FIG. 1 and FIG. 2A) made with the answering terminals 100A shown in FIG. 5 are incorporated in a count and analysis result and output by the answer counting system 10 (FIG. 1 and FIG. 3) based on the detection times output from the clocks 107. Thus, the instructor of the distance education program as the questioner 1 can know the degree of understanding of the learners of the distance education program when he or she sees the count and analysis result. In addition, the instructor can provide an easier-to-understand supplementary explanation about the things that many learners found difficult in the previous distance education program in the next distance education program based on the degree of understanding of the learners. In addition, the instructor can pick up what many learners found interesting in the previous distance education program as a major theme of the next distance education program. When necessary, the instructor can know the degrees of understanding of the learners about the contents of the distance education program individually by identifying the learners based on the terminal codes.

Figure 6:
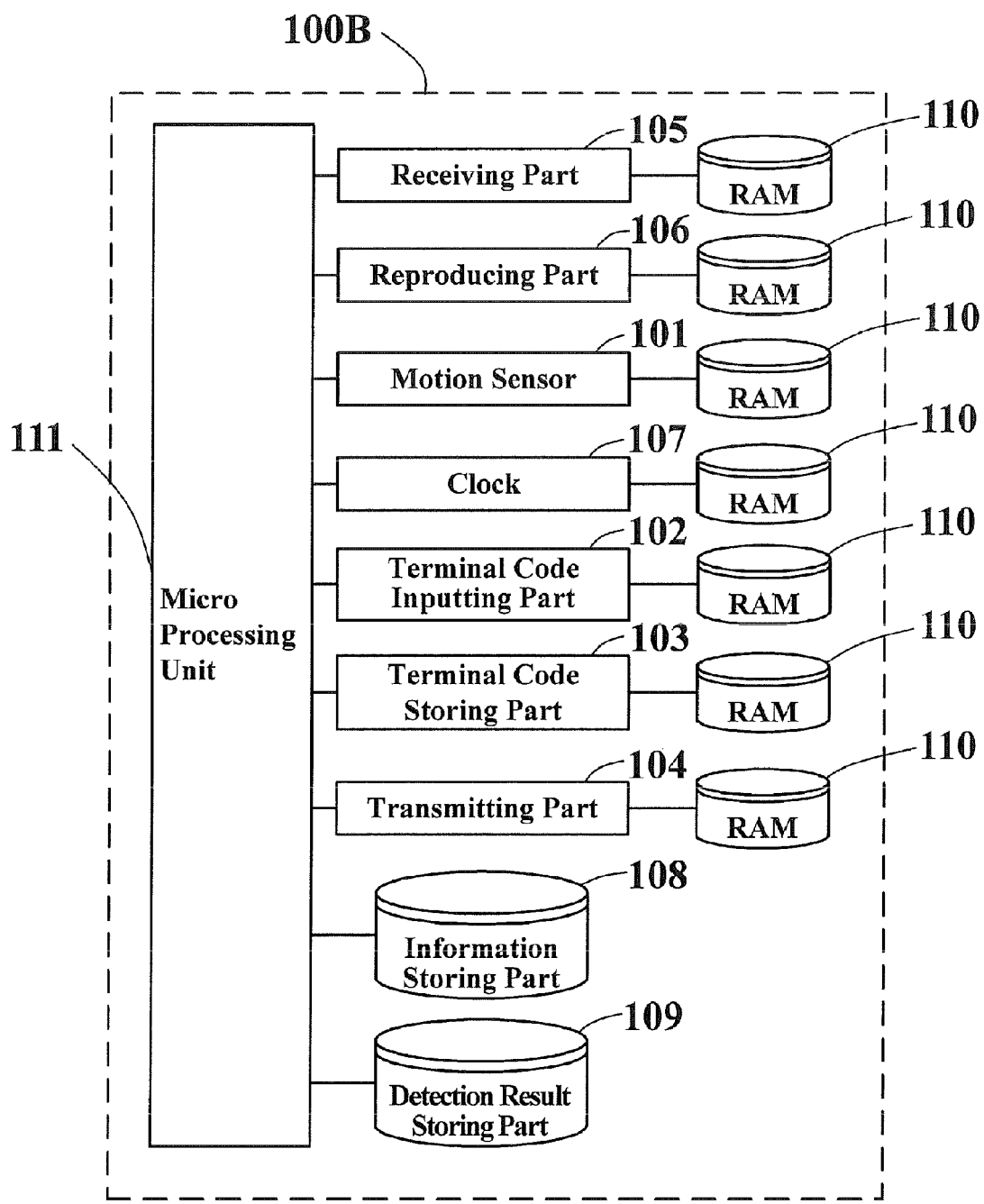
FIG. 6 is a block diagram illustrating the configuration of the answering terminal according to a third embodiment of the present invention.

As shown in FIG. 6, an answering terminal 100B according to a third embodiment of the present invention further includes an information storing part 108 and a detection result storing part 109 in addition to the configuration of the answering terminal 100A (refer to FIG. 5) according to the second embodiment of the present invention described above. The information storing part 108 of the answering terminal 100B shown in FIG. 6 can store information that includes a question and is received by the receiving part 105. For example, the answerer 2 (refer to FIG. 1 and FIG. 2A) can download information including a question from a transmitting part (not shown) of the answer counting system 10 via an information communication network, such as the Internet, with the receiving part 105 and store it in the information storing part 108. The detection result storing part 109 shown in FIG. 6 can store the detection result about an answering action of the answerer 2 detected by the motion sensor 101 in association with a detection time output from the clock 107. In addition, the transmitting part 104 of the answering terminal 100B shown in FIG. 6 can transmit the detection result and detection time stored in the detection result storing part 109 in association with the terminal code stored in the terminal code storing part 103 to the answer counting system 10 (refer to FIG. 1 and FIG. 3) as needed according to a manual operation of the transmitting part 104 by the answerer 2.

As shown in FIG. 6, the use of the information storing part 108 enables the answerer 2 (refer to FIG. 1 and FIG. 2A) to store information including a question and received by the receiving part 105 in the information storing part 108. In addition, the answerer 2 can reproduce the information including a question and stored in the information storing part 108 with the reproducing part 106 and answer to the question as needed. The detection result storing part 109 can automatically store a detection result output from the motion sensor 101 and a detection time output from the clock 107. The answerer 2 can transmit the detection result and detection time stored in the detection result storing part 109 in association with the terminal code to the answer counting system 10 (refer to FIG. 1 and FIG. 3) as needed by manually operating the transmitting part 104. Thus, the answerer 2 can make answer the question from the questioner 1 (refer to FIG. 1) regardless of time and place.

Figure 7:
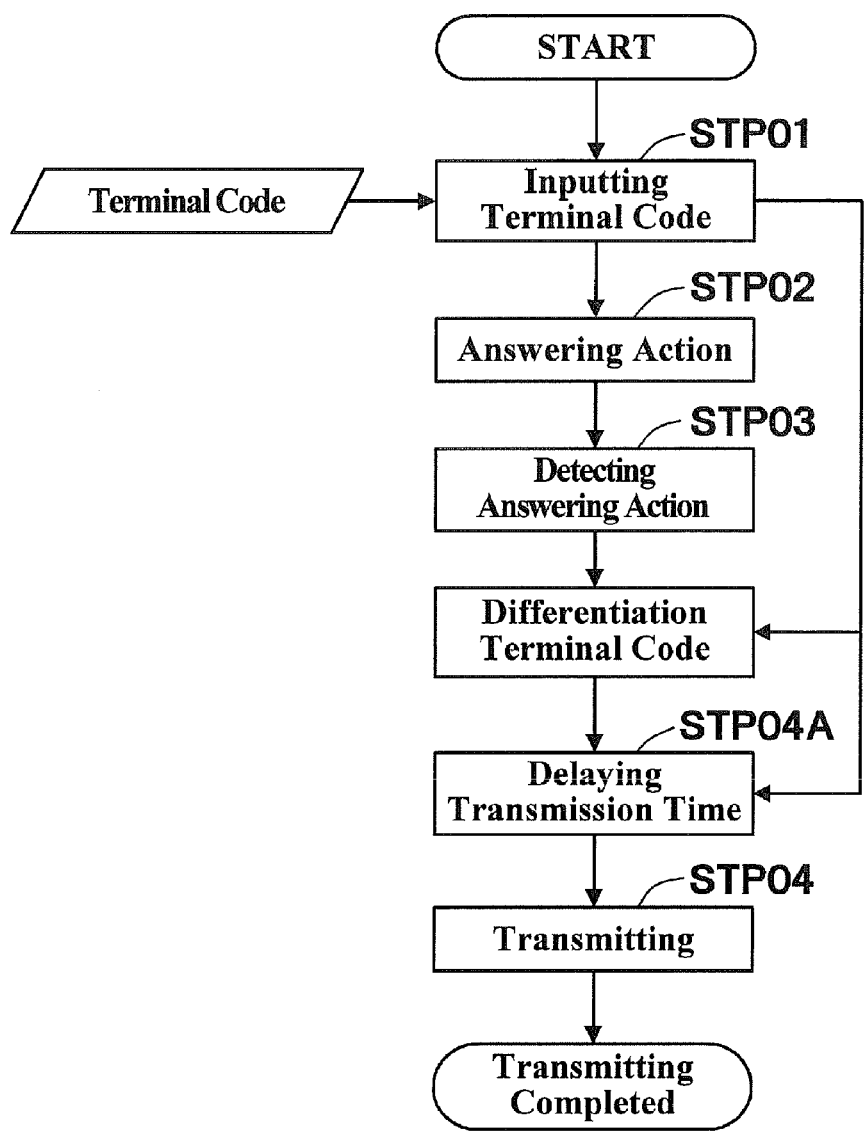
FIG. 7 is a flowchart showing a method for answering a question using the answering terminal according to the first embodiment of the present invention.

Next, in FIG. 7 is shown a method by way of a flow chart, in a direct question-and-answer session between one questioner 1 (refer to FIG. 1) and a multiplicity of answerers 2 (refer to FIG. 1 and FIG. 2A) sharing the same space and time, by which an answerer 2 answer a question from the questioner 1 using the answering terminal 100 (refer to FIG. 1, FIG. 2A and FIG. 4) according to the first embodiment of the present invention. The method according to this embodiment shown in FIG. 7 includes a step of inputting a terminal code by which the answering terminal 100 is identified into the terminal code inputting part 102 (refer to FIG. 4) of the answering terminal 100 (STP01). Thus, even when a multiplicity of answering terminals 100 are present, the answering terminals 100 can be individually identified and differentiated.

In addition, as shown in FIG. 7, the method also includes a step of performing an answering action of shaking the answering terminal 100 (refer to FIG. 1, FIG. 2A and FIG. 4) held by answerer 2 (refer to FIG. 1 and FIG. 2A) in a first direction (for example, vertical direction or horizontal direction) or a second direction different from the first direction (for example, horizontal direction or vertical direction) in response to a question (STP02). Thus, the answerer 2 can answer the question by performing an answering action of shaking the answering terminal 100 in the first direction (for example, vertical direction) (which means a positive answer, for example) or an answering action of shaking the answering terminal 100 in the second direction (for example, horizontal direction) (which means a negative answer, for example).

In addition, as shown in FIG. 7, the method also includes a step of detecting the answering action by a motion sensor 101 (refer to FIG. 4) of the answering terminal 100 (refer to FIG. 1, FIG. 2A and FIG. 4) for outputting the answering action as a detection result detected with the distinction between the first direction (for example, vertical direction or horizontal direction) and the second direction different from the first direction (for example, horizontal direction or vertical direction) (STP03). Thus, the motion sensor 101 can detect an answering action performed by the answerer 2 (refer to FIG. 1 and FIG. 2A) by shaking the answering terminal 100 in the first direction (for example, vertical direction) (which means a positive answer, for example) and an answering action performed by the answerer 2 by shaking the answering terminal 100 in the second direction (for example, horizontal direction) (which means a negative answer, for example) distinctively.

In addition, as shown in FIG. 7, the method also includes a step of transmitting the detection result detected by the motion sensor 101 (refer to FIG. 4) from the transmitting part 104 (refer to FIG. 4) of the answering terminal 100 (refer to FIG. 1, FIG. 2A and FIG. 4) to the answer counting system 10 (refer to FIG. 1 and FIG. 3) in association with the terminal code (STP04). Thus, the answer counting system 10 can obtain a content of the answer from the answerer 2 (refer to FIG. 1 and FIG. 2A) and information by which the answerer 2 can be identified.

In addition, as shown in FIG. 7, the step of transmitting the detection result from the transmitting part 104 (refer to FIG. 4) to the answer counting system 10 (refer to FIG. 1 and FIG. 3) (STP04) includes a step of delaying the time of transmission by the transmission time delaying part 104A (refer to FIG. 4) of the transmitting part 104 from the time when the motion sensor 101 (refer to FIG. 4) detects the answering action by a predetermined delay time (STP04A). Thus, even in a seminar in which a few hundred to several thousand answerers 2 (refer to FIG. 1 and FIG. 2A) are participating, for example, the times of transmission from a multiplicity of answering terminals 100 (refer to FIG. 1, FIG. 2A and FIG. 4) can be spread to avoid congestion in information communication between the answering terminals 100 and the answer counting system 10.

According to the method shown in FIG. 7, the answerers 2 (refer to FIG. 1 and FIG. 2A) can answer a question from the questioner 1 properly with the answering terminals 100 (refer to FIG. 1, FIG. 2A and FIG. 4) of the present invention when the answerers 2 and the questioner 1 (refer to FIG. 1) have a direct question-and-answer session in the same space and time.

Figure 8:
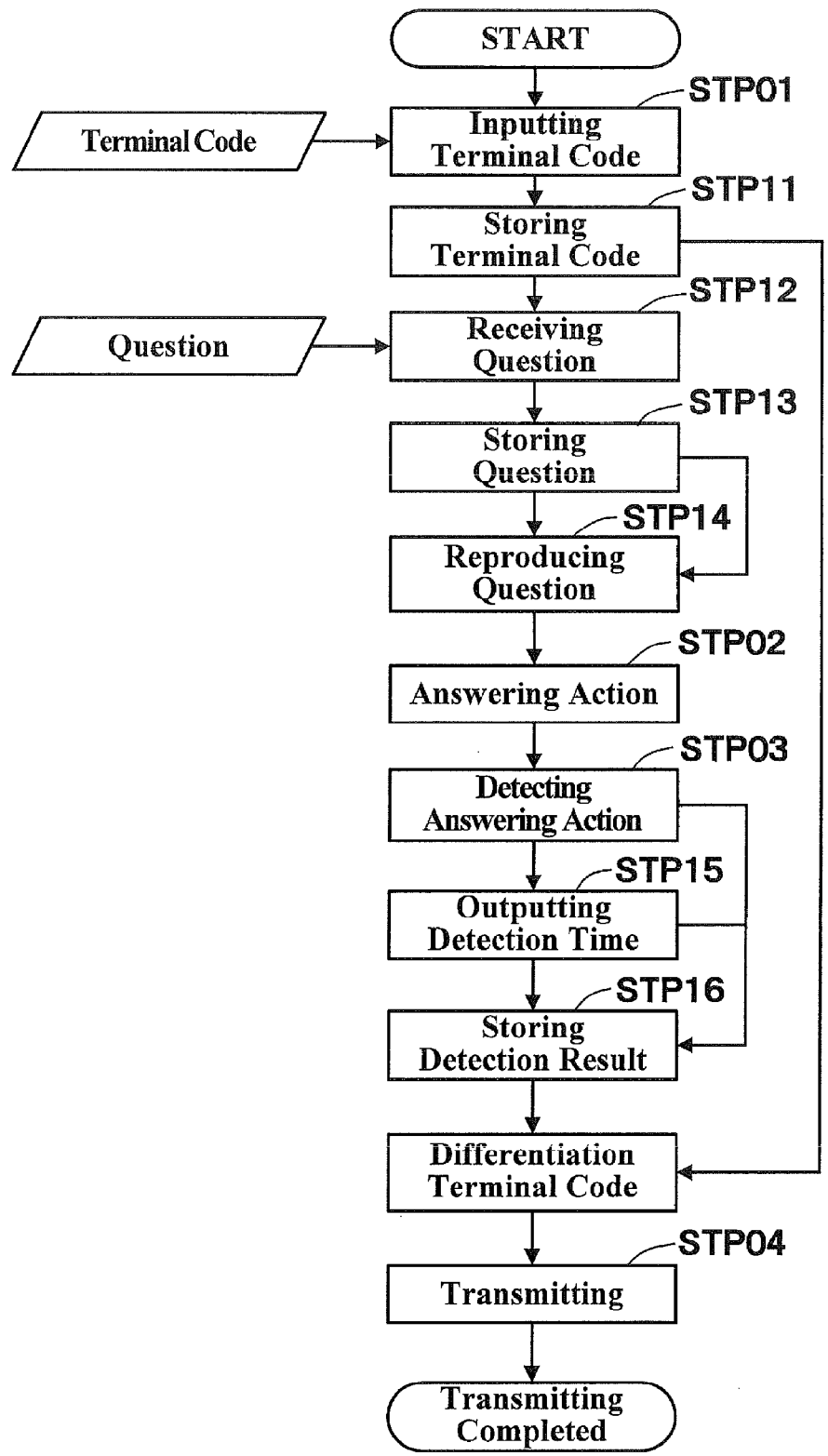
FIG. 8 is a flowchart showing a method for answering a question using the answering terminal according to the third embodiment of the present invention.

Next, in FIG. 8 is shown a method by way of a flow chart, in a question-and-answer session between one questioner 1 (refer to FIG. 1) and a multiplicity of answerers 2 (refer to FIG. 1 and FIG. 2A) in a temporally separated manner, by which an answerer 2 answer a question from the questioner 1 using the answering terminal 100B (refer to FIG. 6) according to the third embodiment of the present invention. The method according to this embodiment shown in FIG. 8 includes a step of inputting a terminal code by which the answering terminal 100B is identified into the terminal code inputting part 102 (refer to FIG. 6) of the answering terminal 100B (STP01). Thus, even when a multiplicity of answering terminals 100B are present, the answering terminals 100B can be individually identified and differentiated.

In addition, as shown in FIG. 8, the method also includes a step of storing the terminal code input through the terminal code inputting part 102 (refer to FIG. 4) in the terminal code storing part 103 (refer to FIG. 6) of the answering terminal 100B (refer to FIG. 6) (STP11). Thus, the answering terminal 100B can use the terminal code, by which the answering terminal 100B can be individually differentiated and identified, stored in the terminal code storing part 103 as needed.

In addition, as shown in FIG. 8, the method also includes a step of receiving the information including the question by the receiving part 105 (refer to FIG. 6) of the answering terminal 100B (refer to FIG. 6) (STP12). Thus, the answering terminal 100B can obtain the information including the question through information communication via an information communication network, such as the Internet.

In addition, as shown in FIG. 8, the method also includes a step of storing the received information including the question in the information storing part 108 (refer to FIG. 6) of the answering terminal 100B (refer to FIG. 6) (STP13). Thus, the answerers 2 (refer to FIG. 1 and FIG. 2A) can store the information including the question in the information storing part 108 and use it.

In addition, as shown in FIG. 8, the method also includes a step of reproducing and presenting the information including the question stored in the step of storing in the information storing part 108 (refer to FIG. 6) (STP13) to the answerer 2 (refer to FIG. 1 and FIG. 2A) by the reproducing part 106 (refer to FIG. 6) of the answering terminal 100B (refer to FIG. 6) (STP14). Thus, the answerer 2 can reproduce and view the information including the question with the reproducing part 106 as needed.

In addition, as shown in FIG. 8, the method also includes a step of performing an answering action of shaking the answering terminal 100B (refer to FIG. 6) held by answerer 2 (refer to FIG. 1 and FIG. 2A) in a first direction (for example, vertical direction or horizontal direction) or a second direction different from the first direction (for example, horizontal direction or vertical direction) in response to a question (STP02). Thus, the answerer 2 can answer the question by performing an answering action of shaking the answering terminal 100B in the first direction (for example, vertical direction) (which means a positive answer, for example) or an answering action of shaking the answering terminal 100B in the second direction (for example, horizontal direction) (which means a negative answer, for example).

In addition, as shown in FIG. 8, the method also includes a step of detecting the answering action with the motion sensor 101 (refer to FIG. 6) of the answering terminal 100B (refer to FIG. 6) for outputting the answering action as a detection result detected with distinction between a first direction (for example, vertical direction or horizontal direction) and a second direction (different from the first direction) (for example, horizontal direction or vertical direction) (STP03). Thus, the motion sensor 101 can detect an answering action performed by the answerer 2 (refer to FIG. 1 and FIG. 2A) by shaking the answering terminal 100B in a first direction (for example, vertical direction) (which means an positive answer, for example) and an answering action performed by the answerer 2 by shaking the answering terminal 100B in a second direction (for example, horizontal direction) (which means an negative answer, for example) distinctively.

In addition, as shown in FIG. 8, the method also includes a step of outputting a detection time when the motion sensor 101 (refer to FIG. 6) detected the answering action of the answerer 2 (refer to FIG. 1 and FIG. 2A) on the time scale of the period in which the information including the question is presented to be reproduced by the reproducing part 106 (refer to FIG. 6) from the clock 107 (refer to FIG. 6) of the answering terminal 100B (refer to FIG. 6) (STP15). Thus, the time when the answerer 2 performed an answering action can be output from the clock 107 as the detection time in conformity with the period in which presentation of the information including the question made in real time by the questioner 1 (refer to FIG. 1) proceeded.

In addition, as shown in FIG. 8, the method also includes a step of storing the detection result detected by the motion sensor 101 (refer to FIG. 6) and the detection time output in the step of outputting a detection time from the clock 107 (refer to FIG. 6) (STP15) in association with each other in the detection result storing part 109 (refer to FIG. 6) of the answering terminal 100B (refer to FIG. 6) (STP16). Thus, the answerer 2 (refer to FIG. 1 and FIG. 2A) can transmit the detection result and detection time stored in the detection result storing part 109 to the answer counting system 10 (refer to FIG. 1 and FIG. 3) as needed.

In addition, as shown in FIG. 8, the method also includes a step of transmitting the detection result stored in the step of storing the detection result and the detection time in the detection result storing part 109 (refer to FIG. 6) (STP16) from the transmitting part 104 (refer to FIG. 6) of the answering terminal 100B (refer to FIG. 6) to the answer counting system 10 (refer to FIG. 1 and FIG. 3) in association with the terminal code stored in the terminal code storing part 103 (refer to FIG. 6) (STP04). Thus, the answer counting system 10 can obtain a content of answer from the answerer 2 (refer to FIG. 1 and FIG. 2A) and information by which the answerer 2 can be identified.

In the method shown in FIG. 8, even when the answerers 2 (refer to FIG. 1 and FIG. 2A) and the questioner 1 (refer to FIG. 1) have a question-and-answer session in a temporally separated manner, each answerer 2 can reproduce the information including the question and answer to the question as needed and can transmit the detection result as information representing the content of the answer of the answerer 2 to the question from the questioner 1 and the detection time and the terminal code to the answer counting system 10 (refer to FIG. 1 and FIG. 3) as needed. The answer counting system 10 can recognize the time when the answerer 2 performed an answering action at a time in the light of the period in which information presentation made by the questioner 1 in real time to present the information including the question proceeded.

Inputting the Terminal Code

Figure 9:
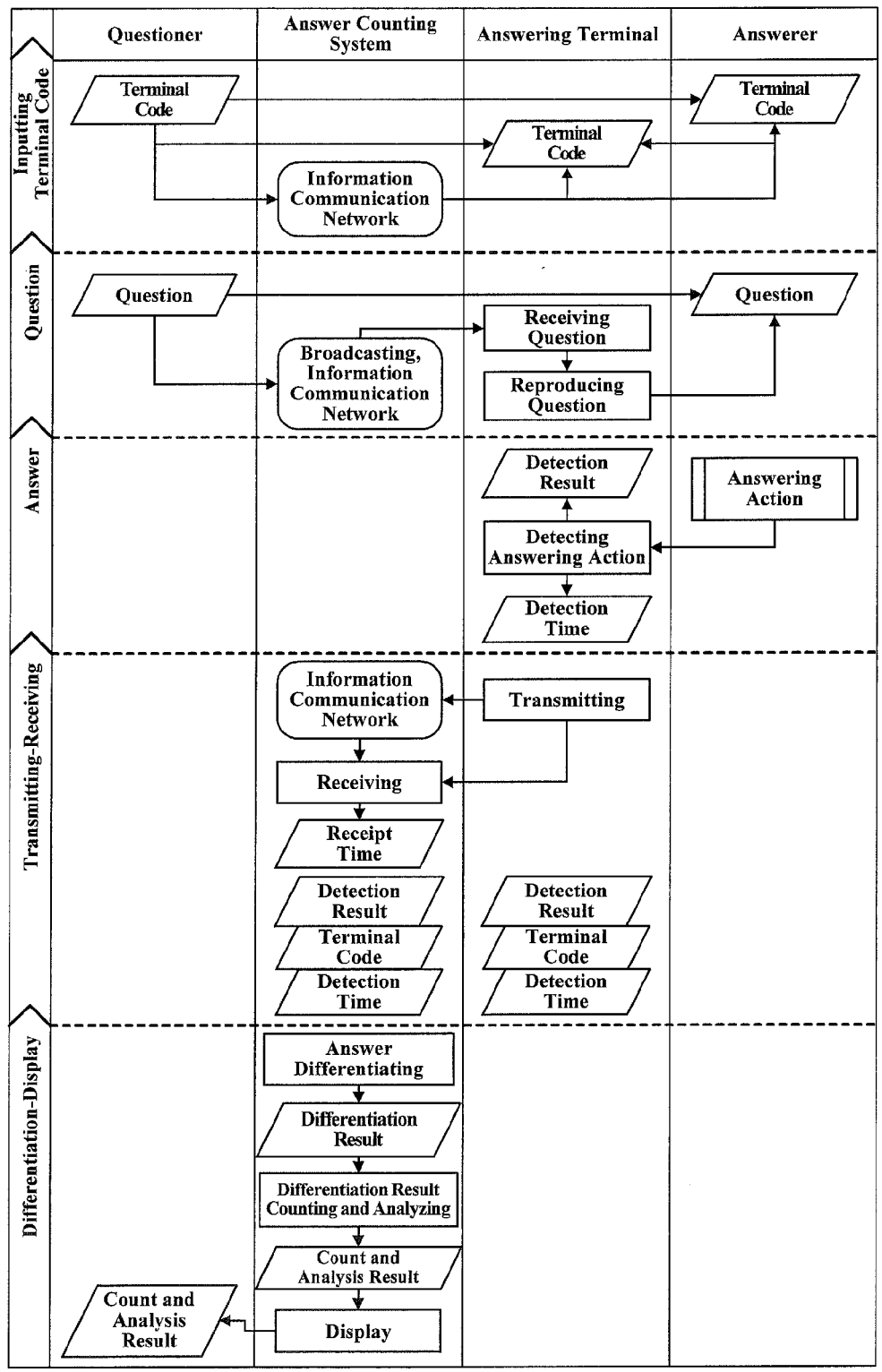
FIG. 9 is an explanatory view illustrating an example of information communication that is performed between the answer counting system and answering terminal according to the third embodiment of the present invention.

FIG. 9 shows an exemplary information communication which is performed between the answer counting system 10 (refer to FIG. 1 and FIG. 3) and the answering terminal 100B (refer to FIG. 6) according to the third embodiment of the present invention. In the third embodiment of the present invention, the terminal codes by which the answering terminals 100B shown in FIG. 9 can be individually identified and differentiated may be individually and directly issued from one questioner 1 (refer to FIG. 1) to a multiplicity of answerers 2 (refer to FIG. 1 and FIG. 2A) as the same string of letters as the entry serial numbers for the site of academic presentation or seminar, for example. Alternatively, the one questioner 1 may input terminal codes into a multiplicity of answering terminals 100B to be used by a multiplicity of answerers 2 in answering in advance and hand out the answering terminals 100B into which the terminal codes have been input to the answerers 2. Alternatively, the answerers 2 may perform information communication with the answer counting system 10 via an information communication network, such as the Internet, by operating their answering terminals 100B and receive a unique terminal code into their answering terminals 100 from the answer counting system 10. The terminal code input into the answering terminal 100B is stored in the terminal code storing part 103 (refer to FIG. 6) of the answering terminal 100B and used.

Question

As shown in FIG. 9, a question from the questioner 1 (refer to FIG. 1) may be delivered orally and directly from the questioner 1 to the answerers 2 when one questioner 1 and a multiplicity of answerers 2 (refer to FIG. 1 and FIG. 2A) have a direct question-and-answer session in the same space and time. On the other hand, when one questioner 1 and answerers 2 have a question-and-answer session in a temporally or spatially separated manner, information including a question may be transmitted from the answer counting system 10 (refer to FIG. 1 and FIG. 3) to the answering terminals 100B (refer to FIG. 6) through broadcast or an information communication network, such as the Internet, and received by the answering terminals 100B. The information including a question and received by the answering terminal 100B is stored in the information storing part 108 (refer to FIG. 6). The answerer 2 can reproduce the information including a question and stored in the information storing part 108 to answer the question as needed.

Answer

As shown in FIG. 9, the answer from the answerer 2 (refer to FIG. 1 and FIG. 2A) is output as a detection result about an answering action performed by shaking the answering terminal 100B (refer to FIG. 6) held by the answerer 2 in one hand in a first direction (for example, vertical direction or horizontal direction) or a second direction (different from the first direction) (for example, horizontal direction or vertical direction) and detected by the motion sensor 101 (refer to FIG. 6) of the answering terminal 100B. In addition, the time when the motion sensor 101 detected the answering action is output as a detection time on the time scale of the period in which information presentation made by the questioner 1 (refer to FIG. 1) in real time to present the information including a question proceeded by the clock 107 (refer to FIG. 6) of the answering terminal 100B. The detection result output from the motion sensor 101 and the detection time output from the clock 107 are stored in the detection result storing part 109 (refer to FIG. 6). Thus, the answerer 2 can transmit the information of detection result and detection time stored in the detection result storing part 109 to the answer counting system 10 (refer to FIG. 1 and FIG. 3) as needed.

Transmitting-Receiving

As shown in FIG. 9, the information of the detection result and detection time stored in the detection result storing part 109 (refer to FIG. 6) of the answering terminal 100B (refer to FIG. 6) transmitted in association with the terminal code stored in the terminal code storing part 103 (refer to FIG. 6) of the answering terminal 100B from the answering terminal 100B to the answer counting system 10 (refer to FIG. 1 and FIG. 3) by a manual operation of the answerer 2 (refer to FIG. 1 and FIG. 2A) as needed. The answering terminal 100B and the answer counting system 10 may perform information communication directly through wireless communication or may perform information communication via an information communication network, such as the Internet. The answer counting system 10 receives the detection result, detection time and terminal code transmitted from the answering terminal 100B, and can output a receipt times indicating the time of reception of the information and store it in the result storing part 15 (refer to FIG. 3).

Differentiation and Display

As shown in FIG. 9, the answer counting system 10 (refer to FIG. 1 and FIG. 3) outputs a differentiation result for distinctively differentiate whether the answerer 2 (refer to FIG. 1 and FIG. 2A) performed an answering action of shaking the answering terminal 100B in a first direction (for example, vertical direction or horizontal direction) or an answering action of shaking the answering terminal 100B in a second direction (different from the first direction) (for example, horizontal direction or vertical direction) based on the detection result received from the answering terminal 100B (refer to FIG. 6). Then, the answer counting system 10 outputs a count and analysis result obtained as a result of counting and analyzing the differentiation results about the answering actions of all the answerers 2 who answered the question from the questioner 1 (refer to FIG. 1). The answer counting system 10 displays and presents the output count and analysis result to the questioner 1.

In addition, the count and analysis result output from the answer counting system 10 (refer to FIG. 1 and FIG. 3) shown in FIG. 9 may be disclosed to the answerers 2 (refer to FIG. 1 and FIG. 2A) by an information disclosing part (not shown) of the answer counting system 10 based on predetermined disclosure criteria. With this configuration, because the count and analysis result can be disclosed to the answerers 2 via an information communication network, such as the Internet, the answerers 2 participating in the question-and-answer session can deepen their consideration and verification of the theme of the question-and-answer session with reference to the count and analysis result. In the information disclosure by the information disclosing part of the answer counting system 10, when information is disclosed with the function of a message board or the like into which people can freely write information about the count and analysis result, the question-and-answer session held between the questioner 1 and the answerers 2 using the answering terminals 100B (refer to FIG. 6) and the answer counting systems 10 according to an embodiment of the present invention may lead to a more fruitful question-and-answer session between the questioner 1 (refer to FIG. 1) and the answerer 2.

INDUSTRIAL APPLICABILTY

The answering terminal and answer counting system of the present invention and the method for answering a question using the answering terminal can be used not only in a question-and-answer session between one questioner and a multiplicity of answerers in the site of a public speaking, such as academic presentation, seminar, lecture at a university, business presentation, workshop or meeting but also for a survey at a site where a large audience gathers, such as recital, concert, movie theater, TV program or sport event. In addition, the answering terminal and answer counting system of the present invention and the method for answering a question using the answering terminal can be used in a customer satisfaction survey in a museum, restaurant or group travel. In addition, the answering terminal and answer counting system of the present invention and the method for answering a question using the answering terminal can be used in a survey via an information communication network, such as the Internet, to find out how the users evaluate a video or music content.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 questioner
2 answerer
10 answer counting system
11 receiving part
12 grouping part
13 answering action differentiating part
14 differentiation result counting and analyzing part
14A answering action counting part
14B intensity determining part
14C motion counting part
14D trajectory determining part
15 result storing part
16 display information selecting part 17 displaying part
18 random access memory
19 central processing unit
100/100A/100B answering terminal
101 motion sensor
102 terminal code inputting part
103 terminal code storing part
104 transmitting part
104A transmission time delaying part
105 receiving part
106 reproducing part
107 clock
108 information storing part
109 detection result storing part
110 random access memory
111 microprocessor

What is claimed is:

1. An answer counting system for counting answers to a question, comprising:
    a receiving part configured to receive detection results at respective times of reception about answering actions performed by answerers to answer a specific question and detected by motion sensors of answering terminals operated by the answerers and terminal codes by which the answering terminals can be identified, wherein the times of reception are based on a clock time of the answer counting system;
    a grouping part configured to group the detection results received by the receiving part based on the times of reception of the detection results;
    a result storing part configured to store the detection results in association with the terminal codes for each group grouped by the grouping part;
    an answering action differentiating part configured to differentiate the detection results between answering actions of shaking the answering terminals in a first direction and answering actions of shaking the answering terminals in a second direction different from the first direction;
    a differentiation result counting and analyzing part configured to count and analyze the detection results for each group on a per group basis; and
    a displaying part configured to display a count and analysis result counted and analyzed in the differentiation result counting and analyzing part.

2. The answer counting system according to claim 1, wherein the differentiation result counting and analyzing part has an answering action counting part configured to count the answering actions performed by shaking the answering terminals in the first direction and second direction and differentiated by the answering action differentiating part without duplication in the group based on the terminal codes.

3. The answer counting system according to claim 1, wherein the differentiation result counting and analyzing part has an intensity determining part configured to quantitatively determine the intensity of each of the answering actions of shaking the answering terminals in the first direction and the answering actions of shaking the answering terminals in second direction differentiated by the answering action differentiating part.

4. The answer counting system according to claim 2, wherein the differentiation result counting and analyzing part has a motion counting part configured to count the number of repetitive motions in at least either the answering actions of shaking the answering terminals in the first direction or the answering actions of shaking the answering terminals in the second direction differentiated by the answering action differentiating part.

5. The answer counting system according to claim 1, wherein the differentiation result counting and analyzing part has a trajectory determining part configured to determine the trajectories of the answering action of the shaking the answering terminals in the first direction and the answering action of the shaking the answering terminals in the second direction differentiated by the answering action differentiating part.

6. The answer counting system according to claim 1, further comprising a display information selecting part configured to select an item to be displayed on the displaying part in the count and analysis result counted and analyzed in the differentiation result counting and analyzing part.

7. An answering terminal for use in answering a question, comprising:
    a motion sensor configured to detect an answering action performed by an answerer in response to a specific question and outputting a detection result about the answering action detected with a distinction between a first direction and a second direction different from the first direction;
    a terminal code inputting part through which a terminal code by which the answering terminal is identified is input;
    a terminal code storing part configured to store the terminal code input through the terminal code inputting part; and
    a transmitting part configured to transmit the detection result detected by the motion sensor in association with the terminal code stored in the terminal code storing part to an answer counting system,
    wherein the transmitting part has a transmission time delaying part configured to delay a time of initiating transmission from a time when the motion sensor detects an answering action of the answerer by a predetermined delay time.

8. The answering terminal according to claim 7, further comprising a receiving part configured to receive information including the question; and a reproducing part configured to reproduce and present the information including a question to the answerer.

9. An answering terminal for use in answering a question, comprising:
    a motion sensor configured to detect an answering action performed by an answerer in response to a specific question and outputting a detection result about the answering action detected with a distinction between a first direction and a second direction different from the first direction;
    a terminal code inputting part through which a terminal code by which the answering terminal is identified is input;
    a terminal code storing part configured to store the terminal code input through the terminal code inputting part;
    a receiving part configured to receive information including the question;
    a reproducing part configured to reproduce and present the information including the question to the answerer at an adjustable rate of speed;
    a clock configured to output a detection time when the motion sensor detected an answering action of the answerer on a time scale of the period in which the information including the question is presented to be reproduced by the reproducing part; and
    a transmitting part configured to transmit the detection result detected by the motion sensor in association with the terminal code stored in the terminal code storing part and the detection time output from the clock to machine-implemented answer counting system, wherein the machine-implemented answer counting system is configured to consider the detection time in counting the answering action.

10. An answering terminal for use in answering a question, comprising:
   a motion sensor configured to detect an answering action performed by an answerer in response to a specific question and outputting a detection result about the answering action detected with a distinction between a first direction and a second direction different from the first direction;
   a terminal code inputting part through which a terminal code by which the answering terminal is identified is input;
   a terminal code storing part configured to store the terminal code input through the terminal code inputting part;
   a receiving part configured to receive information including the question;
   an information storing part configured to store the received information including the question;
   a reproducing part configured to reproduce and present the information including the question and stored in the information storing part to the answerer at an adjustable rate of speed;
   a clock configured to output a detection time when the motion sensor detected an answering action of the answerer on a time scale of the period in which the information including the question is presented to be reproduced by the reproducing part;
   a detection result storing part configured to store the detection result detect by the motion sensor and the detection time output from the clock in association with each other; and
   a transmitting part configured to transmit the detection result and the detection time stored in the detection result storing part in association with the terminal code stored in the terminal code storing part to a machine-implemented answer counting system,
   wherein the machine-implemented answer counting system is configured to consider the detection time in counting the answering action.

11. The answering terminal according to claim 7, wherein the motion sensor is configured to detect the intensity of the answering action.

12. A method for answering a question using an answering terminal, comprising:
   inputting a terminal code by which the answering terminal is identified through a terminal code inputting part of the answering terminal;
   an answerer holding the answering terminal performing an answering action of shaking the answering terminal in a first direction or a second direction different from the first direction in response to the question;
   detecting the answering action with a motion sensor of the answering terminal configured to output the answering action as a detection result detected with a distinction between the first direction and the second direction different from the first direction; and
   transmitting the detection result detected by the motion sensor in association with the terminal code from a transmitting part of the answering terminal to an answer counting system;
   wherein transmitting from the transmitting part to the answer counting system includes a step in which a transmission time delaying part of the transmitting part delays the time of initiating transmission from the time when the motion sensor detects the answering action by a predetermined delay time.

13. A method for answering a question using an answering terminal, comprising:
   inputting a terminal code by which the answering terminal is identified through a terminal code inputting part of the answering terminal;
   storing the terminal code input through the terminal code inputting part in a terminal code storing part of the answering terminal;
   receiving information including the question with a receiving part of the answering terminal;
   storing the received information including the question in an information storing part of the answering terminal;
   reproducing and presenting the information including the question stored in the step of storing in the information storing part to an answerer with a reproducing part of the answering terminal at an adjustable rate of speed;
   the answerer holding the answering terminal performing an answering action of shaking the answering terminal in a first direction or a second direction different from the first direction in response to the question;
   detecting the answering action with a motion sensor of the answering terminal configured to output the answering action as a detection result detected with a distinction between the first direction and the second direction different from the first direction;
   outputting from a clock of the answering terminal a detection time when the motion sensor detected the answering action of the answerer on a time scale of the period in which the information including the question is presented to be reproduced by the reproducing part;
   storing the detection result detected by the motion sensor in association with a detection time output from the clock in the step of outputting a detection time in a detection result storing part of the answering terminal; and
   transmitting the detection result and the detection time stored in the step of storing in the detection result storing part in association with the terminal code stored in the terminal code storing part from a transmitting part of the answering terminal to a machine-implemented answer counting system,
   wherein the machine-implemented answer counting system is configured to consider the detection time in counting the answering action.

* * * * *